(12) United States Patent
Goettle et al.

(10) Patent No.: US 11,246,267 B2
(45) Date of Patent: Feb. 15, 2022

(54) LED GROW-LIGHT SYSTEM

(71) Applicant: DemeGrow, Inc., Sacramento, CA (US)

(72) Inventors: Blane J. Goettle, Golden River, CA (US); Jesse James Graham, Roseville, CA (US); Michael Darren Musgrove, Dixon, CA (US)

(73) Assignee: DEME GROW INC., Sacramento, CA (US)

( * ) Notice: Subject to any disclaimer, the term of this patent is extended or adjusted under 35 U.S.C. 154(b) by 0 days.

(21) Appl. No.: 17/300,225

(22) Filed: Apr. 16, 2021

(65) Prior Publication Data
US 2021/0289712 A1    Sep. 23, 2021

Related U.S. Application Data

(63) Continuation-in-part of application No. 17/300,050, filed on Feb. 16, 2021, and a continuation-in-part of application No. 16/501,984, filed on Jul. 15, 2019, now Pat. No. 10,999,980, which is a continuation-in-part of application No. 16/501,389, filed on Apr. 3, 2019, now abandoned.

(60) Provisional application No. 62/995,891, filed on Feb. 18, 2020, provisional application No. 62/764,091, filed on Jul. 18, 2018, provisional application No. 62/761,710, filed on Apr. 3, 2018.

(51) Int. Cl.
| | | |
|---|---|---|
| A01G 7/04 | (2006.01) | |
| A01G 9/24 | (2006.01) | |
| F21S 4/28 | (2016.01) | |
| F21V 21/15 | (2006.01) | |
| F21Y 103/10 | (2016.01) | |
| F21Y 115/10 | (2016.01) | |

(52) U.S. Cl.
CPC ............. *A01G 7/045* (2013.01); *A01G 9/249* (2019.05); *F21S 4/28* (2016.01); *F21V 21/15* (2013.01); *F21Y 2103/10* (2016.08); *F21Y 2115/10* (2016.08)

(58) Field of Classification Search
CPC . A01G 7/045; A01G 9/249; F21S 4/28; F21V 21/15; F21Y 2103/10; F21Y 2115/10
See application file for complete search history.

(56) References Cited

U.S. PATENT DOCUMENTS

| | | | | |
|---|---|---|---|---|
| 9,777,908 | B1 * | 10/2017 | Churnock | ............... F21V 21/04 |
| 2015/0319933 | A1 * | 11/2015 | Li | .......................... A01G 9/249 47/58.1 LS |

* cited by examiner

*Primary Examiner* — Donald L Raleigh
(74) *Attorney, Agent, or Firm* — James A. Gavney, Jr.; JAG Patent Services

(57) ABSTRACT

A LED grow-light system is disclosed. The LED grow-light system includes one or more grow-light canopies with linear LED light bars to provide upward and downward lighting in a central illumination area. The LED light bars are preferably configured to move up and down relative to a grow bed. The LED grow-light system or grow-light canopies constructed using T-slot interconnects that lock into T-channels of the T-slot bars and/or T-slot light bars.

20 Claims, 20 Drawing Sheets

LED GROW-LIGHT SYSTEM

RELATED APPLICATION

This U.S. patent application is a continuation-in-part of co-pending U.S. patent application Ser. No. 16/501,984, filed on Jul. 15, 2019 titled "DUAL-LAYER LED GROW-LIGHT SYSTEM", is a continuation-in-part of co-pending U.S. patent application Ser. No. 16/501,389, filed on Apr. 3, 2019, and titled "LED GROW-LIGHT SYSTEM" which claims priority under 35 U.S.C. § 119(e) from the U.S. provisional patent application Ser. No. 62/761,710, filed on Apr. 3, 2018, and titled "LED-GROW LIGHT SYSTEM." This U.S. patent application is also a continuation-in-part of co-pending U.S. patent application Ser. No. 17/300,050, filed on Feb. 16, 2021 titled "T-SLOT BAR INTERCONNECT SYSTEM", which claims priority under 35 U.S.C. § 119(e) from the U.S. provisional patent application Ser. No. 62/995,891, filed on Feb. 18, 2020 and titled "T-SLOT BAR INTERCONNECT SYSTEM." This application also claims priority under 35 U.S.C. § 119(e) from the U.S. provisional patent application Ser. No. 62/764,091, filed on Jul. 18, 2018, and titled "DUAL-LAYER LED GROW-LIGHT SYSTEM."

The U.S. patent application Ser. No. 16/501,984, filed on Jul. 15, 2019 titled "DUAL-LAYER LED GROW-LIGHT SYSTEM", the U.S. patent application Ser. No. 16/501,389, filed on Apr. 3, 2019, and titled "LED GROW LIGHT SYSTEM", the U.S. patent application Ser. No. 17/300,050, filed on Feb. 16, 2021 titled "T-SLOT BAR INTERCONNECT SYSTEM", the provisional patent application Ser. No. 62/761,710, filed on Apr. 3, 2018, and titled "LED-GROW LIGHT SYSTEM, the provisional patent application Ser. No. 62/764,091, filed on Jul. 18, 2018, and titled "DUAL-LAYER LED GROW LIGHT SYSTEM" and the U.S. provisional patent application Ser. No. 62/995,891, filed on Feb. 18, 2020 and titled "T-SLOT BAR INTERCONNECT SYSTEM" are all hereby incorporated by reference.

FIELD OF THE INVENTION

The invention relates to LED grow-lighting systems. More particularly, the present invention relates to LED grow-light systems constructed with T-slot bars, light bars, electronics and accessories that secured through T-slot interconnects.

BACKGROUND OF THE INVENTION

A grow-light or plant light, is an artificial light source, generally an electric light, designed to stimulate plant growth by emitting a light appropriate for photosynthesis. Grow-lights either attempt to provide a light spectrum similar to that of the sun, or to provide a spectrum that is more tailored to the needs of the plants being cultivated. Depending on the type of plant being cultivated, the stage of cultivation (e.g. the germination/vegetative phase or the flowering/fruiting phase), and the photo-period required by the plants, specific ranges of spectrum, luminous efficacy and color temperature are desirable for use with specific plants and time periods.

Grow-lights are used for horticulture, indoor gardening, plant propagation, and food production, including indoor hydroponics and aquatic plants. Although most grow-lights are used on an industrial level, they can also be used in households.

According to the inverse-square law, the intensity of light radiating from a point source (in this case a bulb) that reaches a surface is inversely proportional to the square of the surface's distance from the source (if an object is twice as far away, it receives only a quarter the light) which is a serious hurdle for indoor growers, and many techniques are employed to use light as efficiently as possible. Reflectors are thus often used in the lights to maximize light efficiency. Plants or lights are moved as close together as possible so that they receive equal lighting and that all light coming from the lights falls on the plants rather than on the surrounding area. Therefore High Intensity Discharge (HID) lights are often used.

Common types of HID grow-lights include fluorescent grow-lights, Metal Halide (MH) grow-lights, Ceramic Metal Halide (CMH) grow-lights, High Pressure Sodium (HPS) grow-light, and Combination MH and HPS ("Dual Arc") grow-lights. Because of the improved effectiveness, energy costs, and longevity, many grow-light systems now utilize LED technology.

LED grow-lights are composed of light-emitting diodes, usually in a casing with a heat sink and built-in fans. White LED grow-lights provide a full spectrum of light designed to mimic natural light, providing plants a balanced spectrum of red, blue and green. However, the spectrum used varies. White LED grow-light are designed to emit similar amounts of red and blue light with an added green light to appear white.

T-slot bars are generally extruded bars formed from metal. However, T-slot bars can also be formed from plastics, fiberglass and other suitable materials. T-slot bars have been used to from skeletal structures on walls to provide bracing for electrical and plumbing installations and can be interconnected together to form structures using nut/bolt-type of interlocking mechanisms. Aluminum T-slot bars are particularly useful from building larger structure on walls, ceilings and/or build suspended structures for supporting LED-grow lighting.

SUMMARY OF THE INVENTION

One shortcoming of currently available LED grow-light systems is a rapid die-off in light density, and/or light intensity, from the central portion of an LED light canopy towards the outer edges of the LED light canopy. One solution would be to make a LED grow-light canopy that is substantially larger that the grow bed being illuminated by the LED grow-light canopy. This solution however is not satisfactory because of the increased footprint and inefficient energy consumption of the grow-light system. Currently available LED grow-light systems, are also not well suited for providing vertical light canopies for vertical grow beds. Furthermore, the LED grow-light canopy generally needs to be manually raised or lowered to accommodate the growth of plants or change lighting intensity above the grow bed within a central illumination area.

In accordance with an embodiment of the invention to a dual-layer LED grow-light system includes grow-light canopies that maintain a small footprint and provide uniform lighting above a grow bed to the central illumination area. The grow-light canopies include a number of LED light bars, that are preferably elongated linear LED light bars, arranged in parallel on the canopy support structure. Each of the LED light bars include LEDs, or arrays of LEDs, arranged along a light emitting surface. The light emitting surfaces of the linear LED light bars collectively illuminate a grow bed positioned relative to the grow-light canopies.

The LEDs utilized in the LED light bars of the present invention can include LEDs emitting light having any number of wavelengths/colors, or combinations of wavelengths/colors, suitable for the application at hand. The LEDs utilized in the linear LED light bars can be tunable to change light emitting profiles and can also be dimmed to change the intensity of light emitted from individual LED light bars or collectively from all of the LED light bars.

In accordance with the embodiments of the invention, the operation of the grow-light system and/or position of the grow-light canopy is controlled by a control module. The control module includes a computer with a micro-processor and memory. The computer is configured to run software stored on the memory and implement grow-light protocols or programs. The grow-light protocols or programs can be dynamically modified in response to environmental feedback from a number of sensors located on or near LED grow-light system. The control module can, for example, control the intensity or density of light emitted, the distribution light emitted, and/or the wavelength of light emitted from light emitting surfaces of the LED light bars, to comply with a grow-light protocol or program suitable for the vegetation being cultivated and also preferably control vertical positioning of the grow-light canopy, such as described below.

In accordance with a preferred embodiment of the invention, the grow-light canopy provides substantially uniform light density and/or light intensity over the a central illumination area of a grow bed by reducing the light density and/or light intensity die-off at outer edges of the light canopy. Light density refers to a summation of photons emitted of all wavelengths over an area, and light intensity refers to a number of photons emitted for a selected wavelength over the area; light density and light intensity can, in some cases, be used interchangeably. Luminous flux (in lumens) is a measure of the total amount of light output in all directions, while luminous intensity (in candelas) is a measure of beam brightness in a particular direction. This application is generally concerned with luminous intensity of light that reaches a grow bed positioned below a grow-light canopy. However, it is understood that for unfocused light, luminous flux and luminous intensity are generally proportional to each other.

To reduce die-off of light density and/or light intensity at outer edges of a grow-light canopy, the present invention utilizes LED light bars with spatially modulated LED configurations. For example, LEDs, or arrays of LEDs, are spaced or positioned along the light emitting surfaces such that distances between adjacent LEDs, or arrays of LEDs, are sequentially reduced, when moving from the center portion of the light emitting surface of a LED light bar to the two end portions of the light emitting surfaces of the LED light bar.

In further embodiments of the present invention, LED light bars with physically modulated LED configurations are utilized, wherein larger arrays of LEDs are positioned near end portions of the light emitting surfaces of LED light bars, and smaller arrays of LEDs are positioned near center portions of the light emitting surfaces of the LED light bars.

In yet further embodiments of the present invention, LED light bars are spatially modulated within the canopy, such that separations between adjacent LED light bars is greater near outer edges of the grow-light canopy than separations of the LED light bar near the center portions of the grow-light canopy.

In accordance with a preferred embodiment of the invention, linear LED light bars, or a portion thereof, are configured to move up and down relative to the grow bed. The linear LED light bars, and the portion that is configured to move up or down manually and/or automatically, respond to control commands from a controller module and/or feedback from the grow-light, sensors. The positions of the linear LED light bars relative to the grow bed can be controlled from a wireless control or a remote computer to execute grow-light protocols or programs. The positions of the linear LED light bars relative to the grow bed are preferably controlled through stepper motors attached to the LED grow-light canopy, which move up and down along vertical canopy support pole structures of the LED grow-light system.

Whether the LED grow-light system included one or more light canopies, the system is preferably constructed using a quick interconnect system for connecting T-slot bars and T-slot light bars together and/or installing T-slot bar structures to walls or ceilings and/or attaching electronic accessories to the T-slot bar structures.

The quick interconnect system of the present invention utilizes T-slot interconnects. A T-slot interconnect includes body portion with two substantially orthogonally and elongated interlock tabs positioned on opposed sides of the body portion. In operation, one of the elongated interconnect tabs is fitted into a T-slot channel of a T-slot bar and is rotated through the body portion, such that the elongated interconnect tab is locked within the T-channel of the T-slot bar.

In accordance with an embodiment of the invention, the remaining elongated interconnect tab is placed into a T-channel of a second T-slot bar and the second T-slot bar is rotated such the remaining elongated interconnect tab is locked within the T-channel of the second T-slot bar to build a T-slot bar structure.

Alternatively, the two substantially orthogonally and elongated interlock tabs of a T-slot interconnect are placed within T-channels of two orthogonally positioned T-slot bars. The T-slot interconnect is then rotated through a body portion of the T-slot interconnect to secure the two substantially orthogonally and elongated interlock tabs within the T-channels of the two orthogonally positioned T-slot bars and, thereby, secure the T-slot bars in their respective orthogonal position. The T-slot interconnect is rotated through a body portion using a extended clip, hook, cable harnesses or other structure and/or a tool or a wrench, such as described below.

In further embodiments of the invention the T-slot interconnect has an extended clip, hook, harnesses or other structure attached to, for example, the body portion of the T-slot interconnect. The extended clip, hook, harnesses or other structure can be used for supporting or securing wiring or cables. Also, the extended clip, hook, harnesses or other structure can be used as a lever to rotate the T-slot interconnect to secure elongated interlock tabs within the T-channels of T-slot bars, such as described above.

In still further embodiments of the invention the body portion of a T-slot interconnect is formed from two hexagonally shaped parts or portions that are capable of being independently rotated with respect to each other using, for example with a wrench of other suitable tool. The two hexagonally shaped parts or portions are coupled to the opposed and elongated interconnect tabs and for independently rotating the opposed and elongated interconnect tabs and securing the opposed and elongated interconnect tabs within T-channels of T-slot bars, as described above.

There are also a number of applications where T-slot interconnects are attached to one T-slot bar through one of the elongated interconnect tabs. For example, a T-bar interconnect can have mounting features or structures for attaching the T-bar interconnect to a wall, a ceiling or other structure for supporting an attached T-slot bar or T-slot bar structure. A T-bar interconnect can also be installed in one T-slot bar for holding cables/wires and/or supporting electronics while being attached to the T-slot bar.

The T-slot interconnects described above and below are used to secure elongated light bars with T-slots, referred to herein as T-slot light bars, to T-slot bars and build LED grow-light structures or grow-light canopies.

DETAILED DESCRIPTION OF THE INVENTION

Figure 1A:
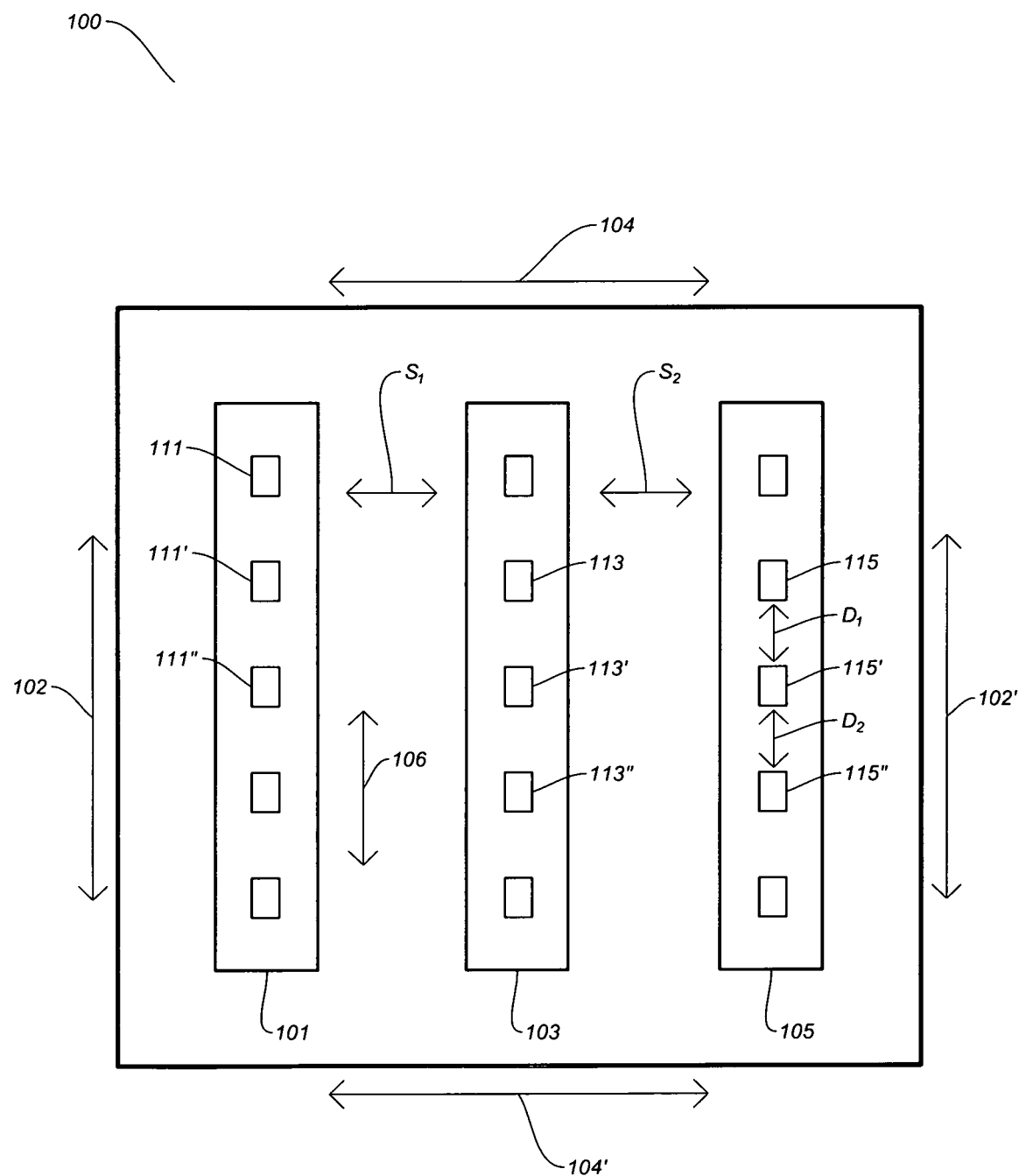
FIG. 1A shows a schematic representation of a grow-light canopy with linear LED light bars.

Referring to FIG. 1A, a LED grow-light system can include a LED grow-light canopy 100 with any number of LED light bars 101, 103 and 105. The LED light bars 101, 103 and 105 are preferably linear elongated LED light bars that are arranged to be parallel with respect to each other in a parallel or elongated direction, as indicated by the arrow 106.

Each of the LED light bars 101, 103 and 105 include LEDs or arrays of LEDs 111/111'/111", 113/113'/113", and 115/115'/115", respectively. The separation between adjacent and sequential LEDs or arrays of LEDs 111/111'/111", 113/113'/113", and 115/115'/115" is uniform, as indicated by the arrow $D_1$ and $D_2$. Also, the parallel separations of distances between adjacent LED light bars is also usually uniform, as indicated by the arrow $S_1$ and $S_2$. The light canopy 100 described and illustrated in FIG. 1A will exhibit die off in light density, and/or intensity, around the outside edges 102/102' and 104/104' of the LED grow-light canopy 100 and around edges of any grow bed of comparable size positioned below the LED grow-light canopy 100.

Figure 1B:
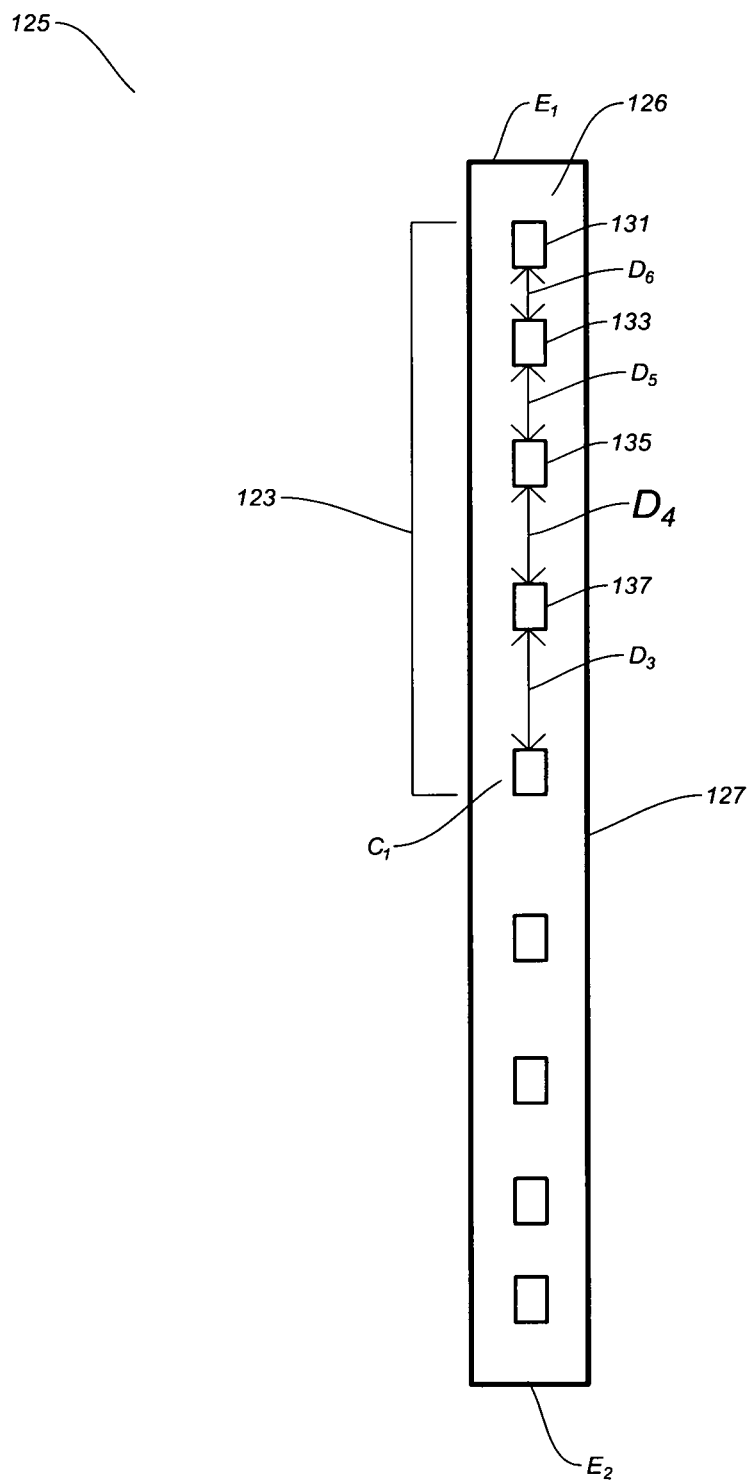
FIG. 1B illustrates a linear LED light bar with spatially modulated LEDs, or arrays of LEDs, located along a light emitting surface of the linear LED light bar, in accordance with the embodiments of the invention.

FIG. 1B illustrates a linear LED light bar 125 with spatially modulated LEDs, or arrays of LEDs, 131, 133, 135, and 137 that are located along a light emitting surface 126 of the linear LED light bar 127. The spatially modulated LEDs, or arrays of LEDs, 131, 133, 115 and 137 are arranged such that distances $D_3$, $D_4$, $D_5$ and $D_6$ between adjacent LEDs are sequentially reduced from the center of portions $C_1$ of the light emitting surface 126 to the two end portions $E_1$ and $E_2$ of the light emitting surfaces 126 or LED light bar. Using light bars with the spatially modulated LEDs, or arrays of LEDs, 131, 133, 115 and 137 to form a LED grow-light canopy increase light density and/or light intensity emitted around edges of the LED grow-light, while keeping the LED grow-light canopy footprint sized to match a grow bed of the same or similar size. In further embodiments, groups of LEDs or arrays of LED's 123 can be grouped to form LED arrays of various sizes.

Figure 1C:
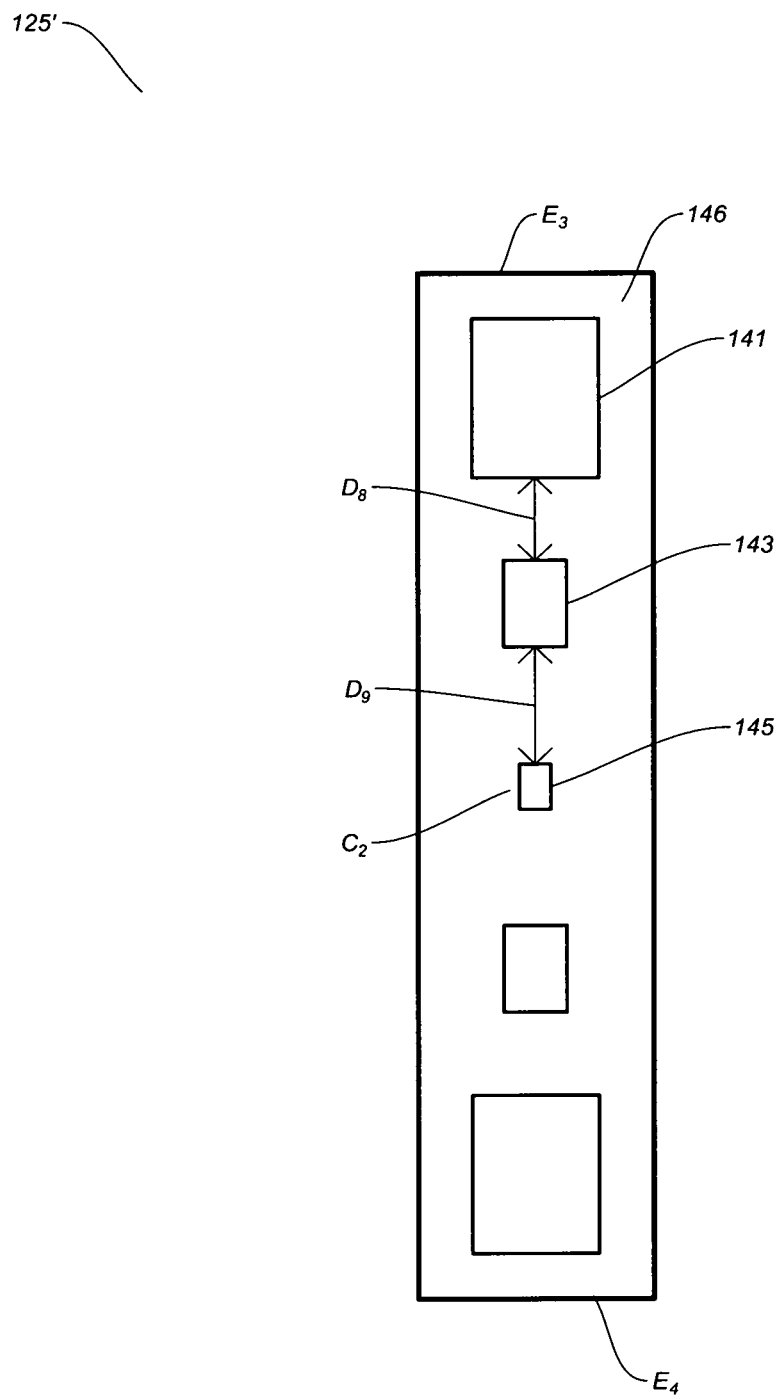
FIG. 1C. illustrates a linear LED light bar with physically modulated LEDs, or arrays of LEDs, located along a light emitting surface of the linear LED light bar, in accordance with the embodiments of the invention.

FIG. 1C. illustrates a linear LED light bar 125' with physically modulated LEDs, or arrays of LEDs, or grouping of LEDs 141, 143 and 145, located along a light emitting surface 146 of the linear LED light bar 125'. In accordance with this embodiment of the invention, the form factor or size of the LEDs, or arrays of LEDs, or grouping of LEDs, are larger near end regions $E_3$ and $E_4$ than the center region $C_2$. The LED groupings 141, 143 and 145 are arranged such that distances $D_8$ and $D_9$ between adjacent LEDs are sequentially reduced from the center portions $C_2$ of the light emitting surface 146 to the two end portions $E_3$ and $E_4$ of the light emitting surfaces 146 on the LED light bar 125'.

Figure 1D:
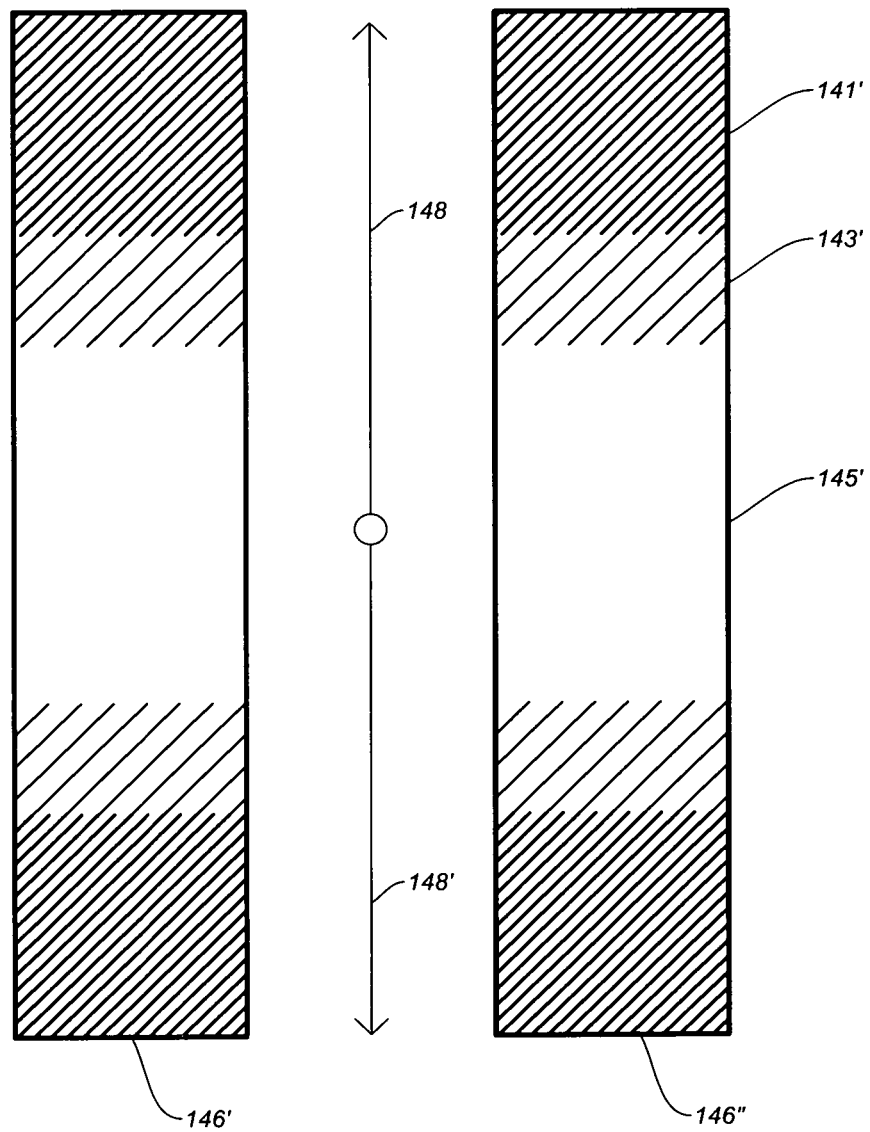
FIG. 1D shows a schematic representation of light density emitted from light emitting surfaces of modulated linear LED light bars

Referring now to FIG. 1D, whether LED light bars have spatially modulated LEDs, or arrays of LEDs, such as described with reference to FIG. 1B, or physically modulated or sized arrays of LEDs, such as described with respect to FIG. 1D, the LED light bars 146' and 146" used to form a grow-light canopy of the present invention preferably exhibit a gradient distribution of lighting, as indicated by the shading 141', 143', and 145', in the linear or elongated directions, indicated by the arrows 148 and 148'. The gradient distribution of light, as indicated by the shading 141', 143', and 145', exhibited by the LED light bars 146' and 146", in the directions 148 and 148', preferably corresponds to increase of light density or light intensity (luminous flux and luminous intensity) of 5%-25% or more as measured from the central portions of the linear LED light bars 146' and 146" to each end portion of the LED light bars 146' and 146".

Figure 1E:
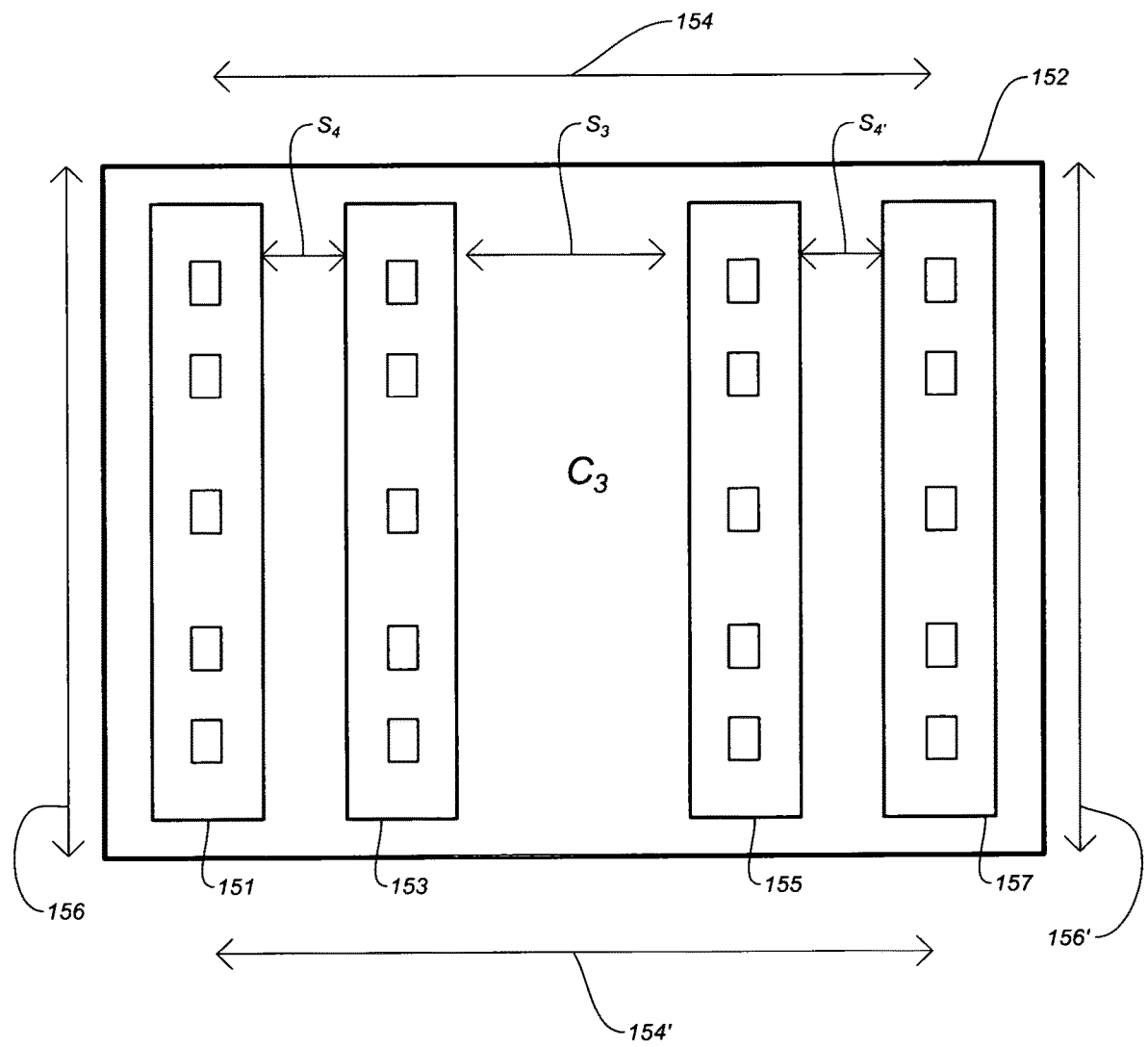
FIG. 1E shows a schematic representation of a grow-light canopy with linear LED light bars that are modulated through parallel separation, in accordance with the embodiments of the invention.

Referring to FIG. 1E, while modulated linear LED light bars 151, 153, 155 and 157, described above with respect to FIGS. 1B-C, reduces die-off of light density, or light intensity, at/or near end edges 154 and 154' of a grow box positioned under or below a LED grow-light canopy 152 formed from the modulated linear LED light bars, parallel edges 156 and 156' of the grow box can still experience die-off light density and/or light intensity. In order to address the die-off in light density or light intensity at/or near parallel or outer edges of the grow box, the parallel separation, or distances $S_4$, $S_3$, $S_4'$, between adjacent linear LED light bars are modulated such that the separation, or distances $S_4$, $S_3$, $S_4'$, decrease from a center portions $C_3$ of the LED grow-light canopy to outer side portions of parallel edges 156 and 156' of the LED grow-light canopy 152.

Figure 2A:
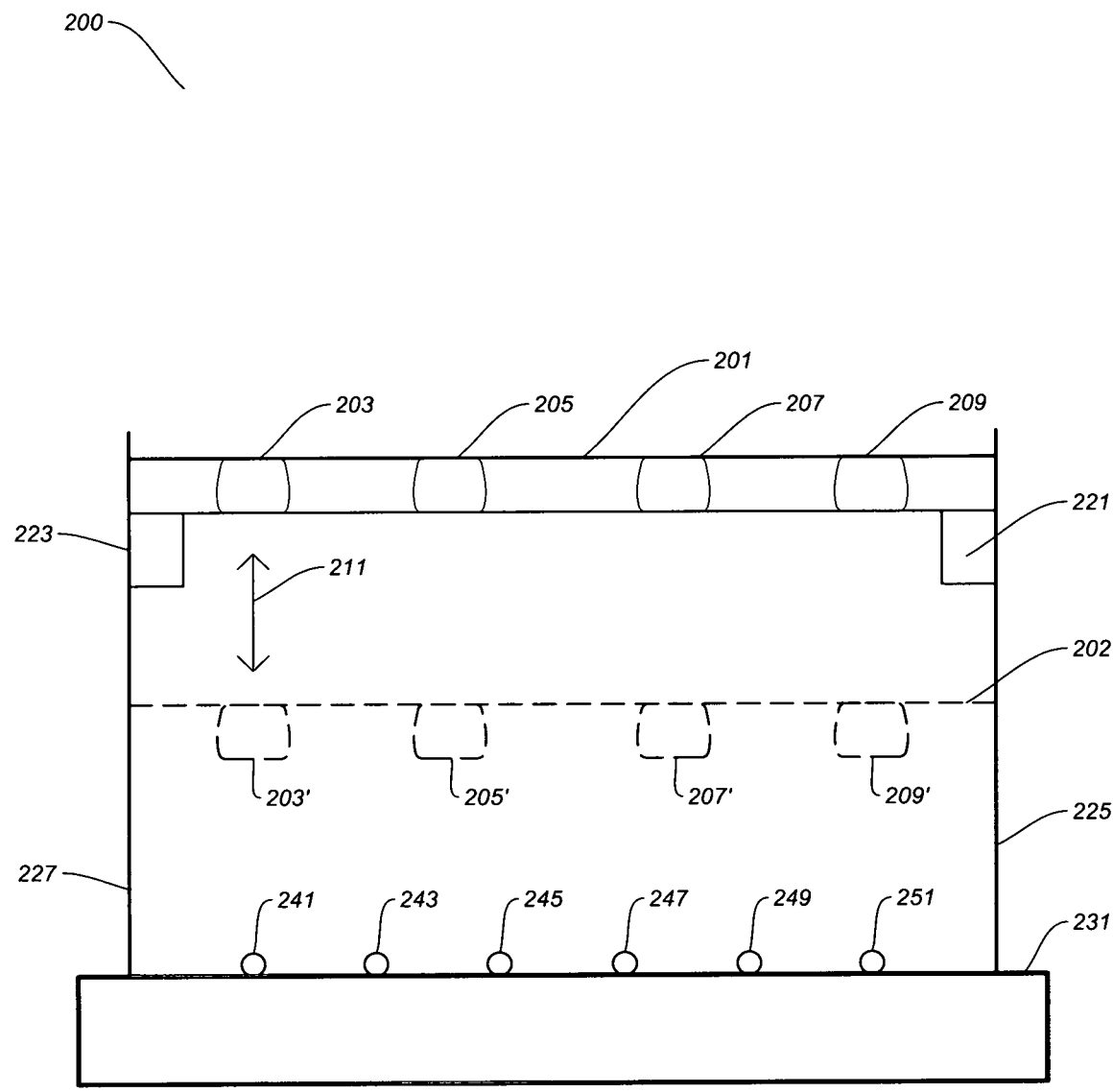
FIGS. 2A-B show schematic representations of LED grow-light systems with linear LED light bars that move up and down relative to a grow-light bed, in accordance with the embodiments of the invention.

FIG. 2A shows a schematic representation of a LED grow-light system 200. The LED grow-light system 200 includes a grow-light canopy 201. The grow-light canopy includes linear LED light bars 203, 205, 207 and 209. The LED light bars 203, 205, 207 and 209 can include modulated LEDs, or arrays or LED, and/or be spatially modulated with respect to each other laterality on the grow-light canopy 201, such as described above with reference to FIG. 1E.

Preferably, the grow-light canopy 201 and/or the LED light bars 203, 205, 207 and 209 move up and down, as indicated by the arrow 211. In a lowered position 202, the LED light bars 203', 205', 207' and 209' can emit greater intensity of light onto the grow bed 231. Preferably, the light canopy 201 and/or the LED light bars 203, 205, 207 and 209 move up and down by stepper motors 221 and 223 that are attached to the grow-light canopy 201 as well as attached to vertical pole structures 225 and 227 supporting the grow-light canopy 201 over the grow bed 231.

Still referring to FIG. 2A, the LED grow system 200 also includes sensors 241, 243, 245, 247, 249 and 251 for providing environmental data. The sensors 241, 243, 245, 247, 249 and 251 can include, but are not limited to, light sensor, moisture sensor and temperature sensor. The environmental data generated by the sensor can be used to determine a desired or preferred position of the light canopy 201 relative to the grow bed 231 and/or can be used to implement an automated grow-light protocols or programs suitable for the vegetation being cultivated.

Figure 2B:
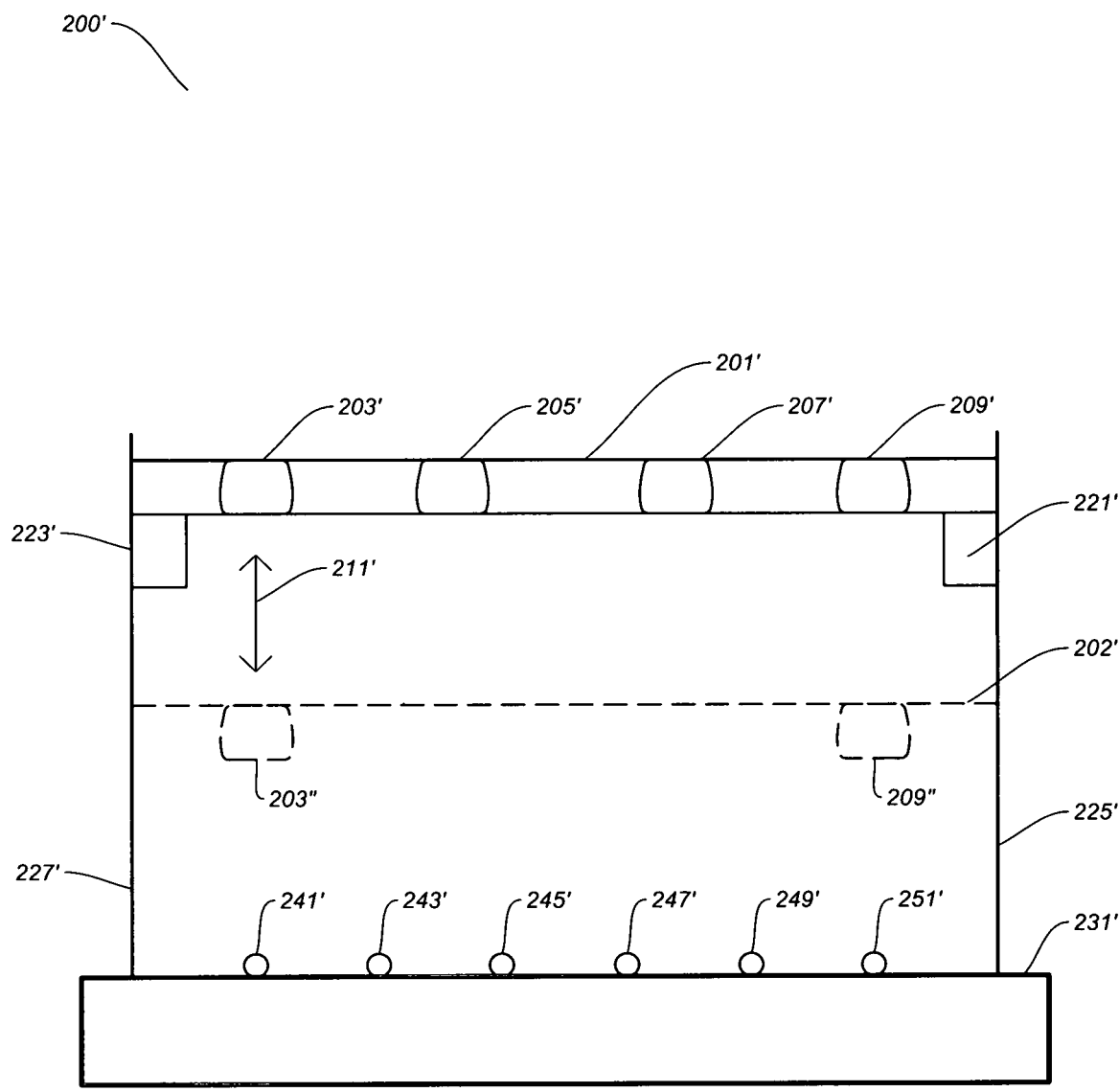

Referring to FIG. 2B, in an alternative embodiment of the invention, a LED grow-light system 200' includes a grow-light canopy 201' with LED light bars 203', 205', 207' and 209', wherein a portion of the LED light bars 203' and 209' move up and down, as indicated by the arrow 211' to the lowered position 202' with lowered LED light bars 203" and 209". In this way, the relative heights of LED light bars 203', 205', 207' and 209' can be modulated relative to the grow bed 231'. As mentioned previously, the LED grow system 200' can include any number of sensors 241', 243', 245', 247', 249' and 251', which are used to instruct and control positions of the LED light bars 203', 205', 207' and 209' relative to the grow bed 231', and used to implement an automated grow-light protocol or program suitable for the vegetation being cultivated.

Figure 3A:
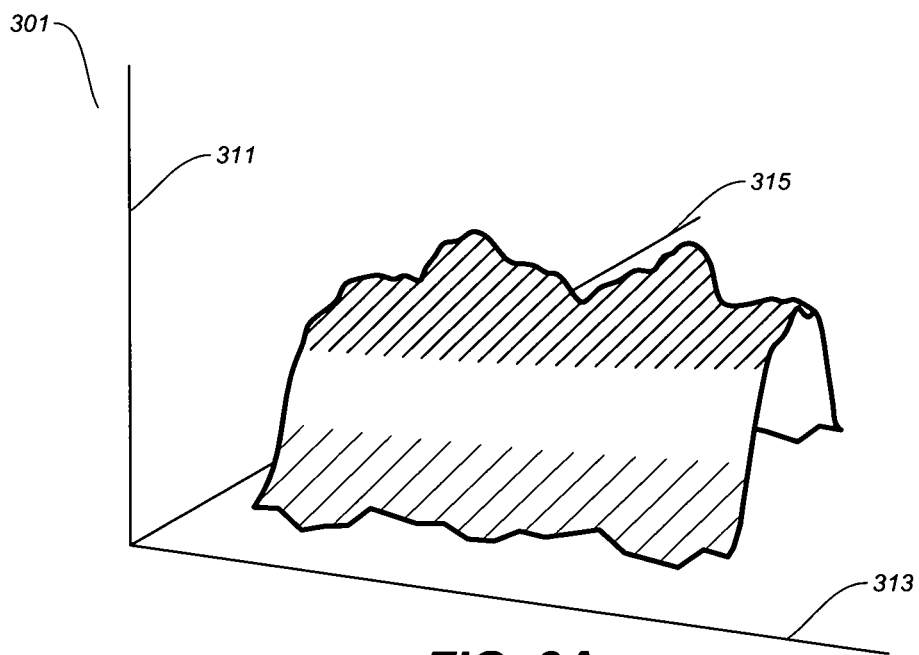
FIGS. 3A-B show graphical representations of evenly distributed light density over the grow-light bed afforded from an LED grow-light system of the present invention and prior art LED grow-light systems, respectively.

FIG. 3A shows a graphical representation 301 of an evenly distributed light density, or light intensity 311, over the area of a grow-light bed. The axis 315 corresponds to light density, or light intensity, at/or near end edges 154/154' (FIG. 1E) of a grow box 231/231' (similar to FIG. 2A-2B) positioned under, or below, a LED grow-light canopy 152 (FIG. 1E) formed from modulated linear LED light bars. Axis 313 corresponds to parallel edges 156/156' (FIG. 1E) of a grow box 231/231' (similar to FIG. 2A-2B) positioned under, or below, a LED grow-light canopy 152 (FIG. 1E) formed from modulated linear LED light bars.

Figure 3B:
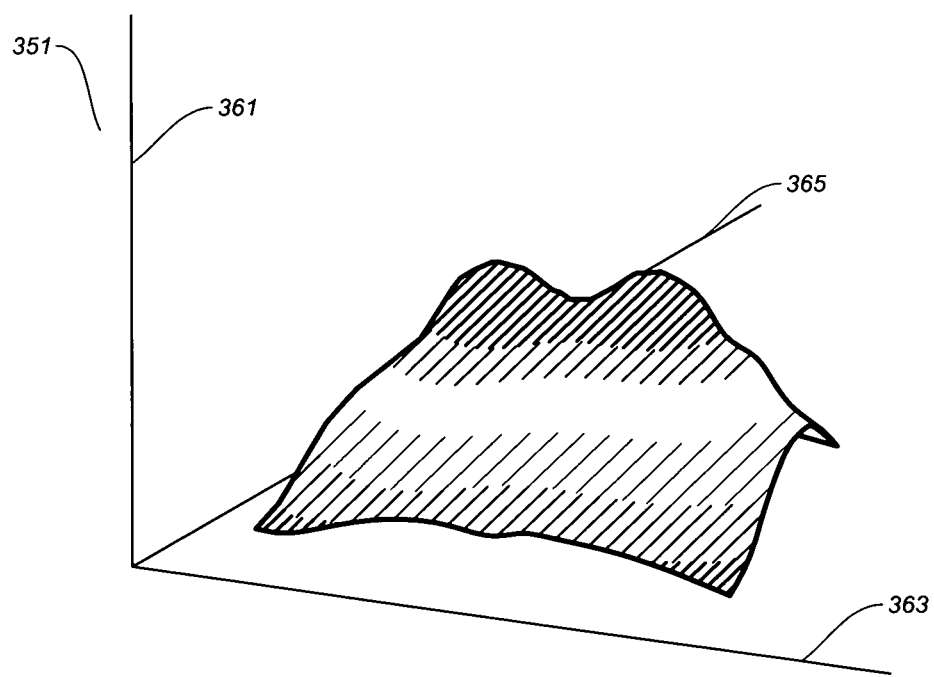

FIG. 3B shows a graphical representation 351 of an unevenly distributed light density and/or light intensity 361 over the area of a grow-light bed. The axis 365 corresponds to light density, or light intensity, at/or near end edges 154/154' (FIG. 1E) of a grow box 231/231' (similar to FIG. 2A-2B) positioned under, or below, a LED grow-light canopy 152 (FIG. 1E) formed from unmodulated linear LED light bars. Axis 363 corresponds to parallel edges 156/156' (FIG. 1E) of a grow box 231/231' (similar to FIG. 2A-2B) positioned under or below a LED grow-light canopy 152 (FIG. 1E) formed from unmodulated linear LED light bars.

Comparing FIG. 3A and FIG. 3B, the light density, and light intensity, near end edges 154/154' (FIG. 1E) of a grow box 231/231' (similar to FIG. 2A-2B) positioned under or below a LED grow-light canopy 152 (FIG. 1E) is more evenly distributed with modulated linear LED light bars than with unmodulated LED light bars.

Figure 4A:
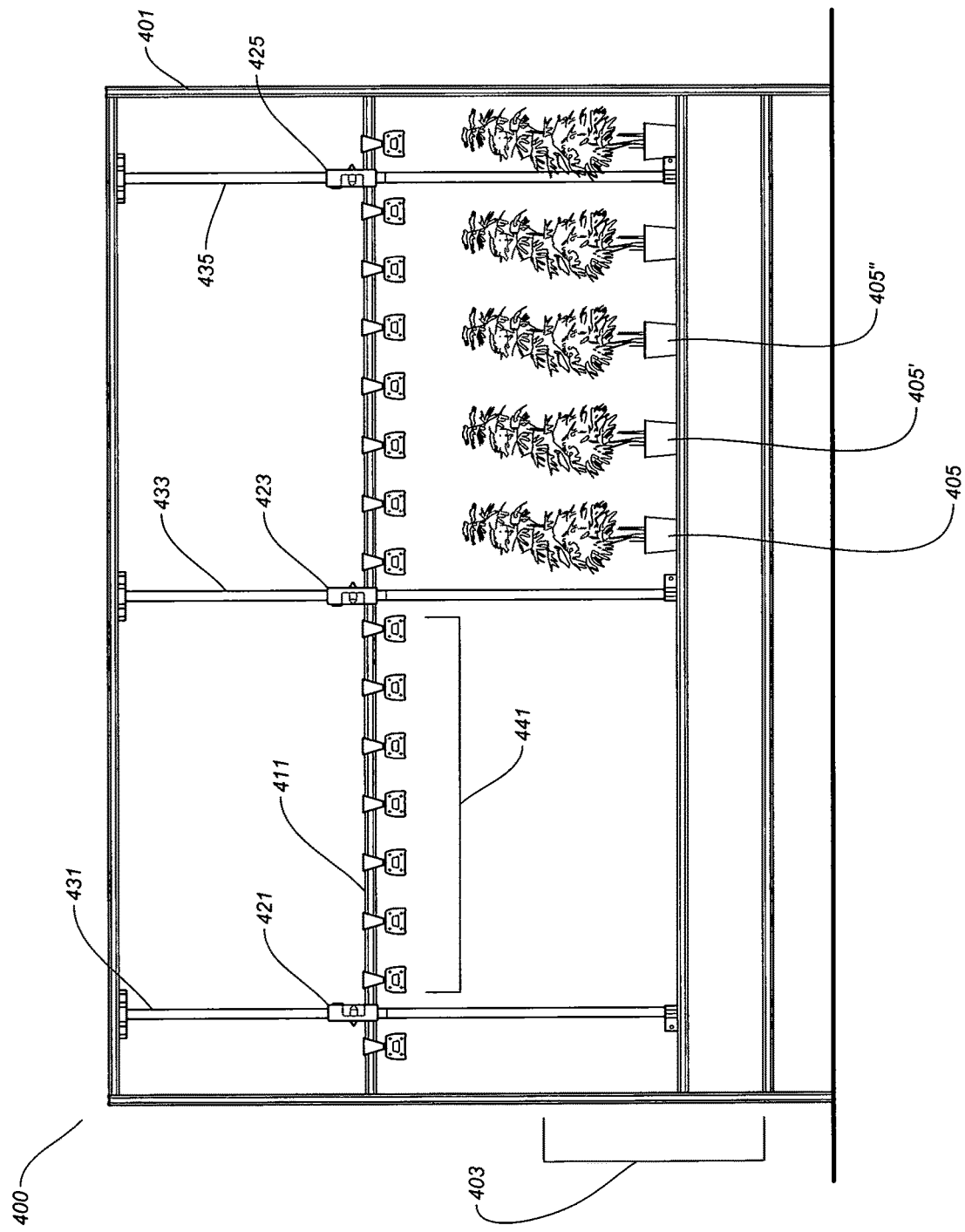
FIGS. 4A-B illustrate a LED grow-light system with a LED grow-light canopy that moves up and down relative to a grow bed using stepper motors, which are attached to the LED grow-light canopy, and move up and down along the canopy support pole structure, in accordance with the embodiments of the invention.
Figure 4B:
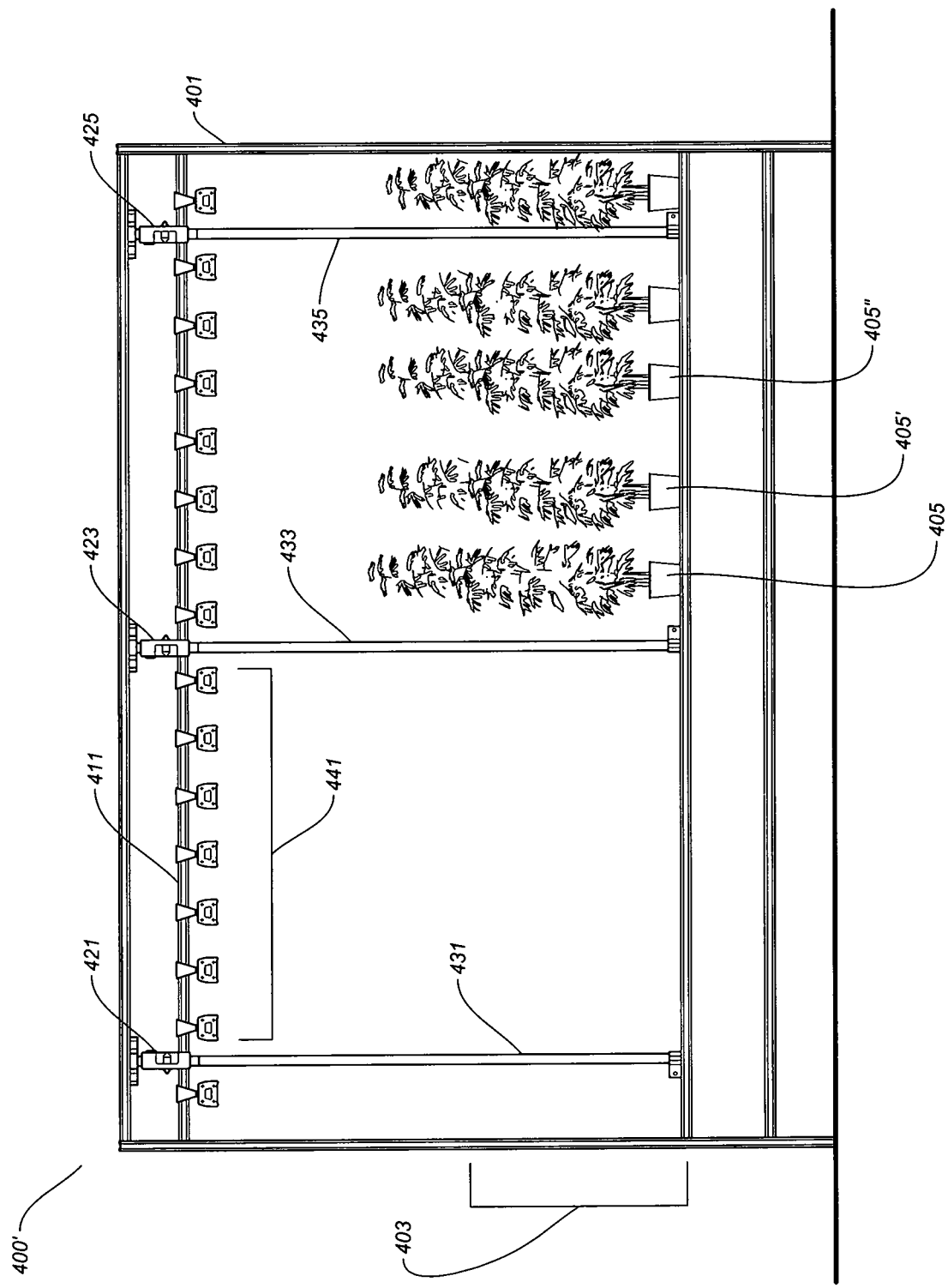

Referring to FIGS. 4A-B, a LED grow-light system 400/400' includes a grow-light canopy 411 with any number of LED light bars 441 that move up and down relative to a grow bed 403. The grow-light, system 400 has a support structure 401 that include vertical poles 431, 433, and 435. The grow-light canopy 411 preferably moves up and down relative to the grow bed 441 using stepper motors 421, 423 and 425, that are attached to the grow-light canopy 411, which moves up and down along vertical poles 431, 433, and 435. In accordance with the embodiments of the invention, the grow-light canopy 411 will automatically move vertically to accommodate the growth of vegetation 405, 405', and 405" being cultivated.

Figure 5A:
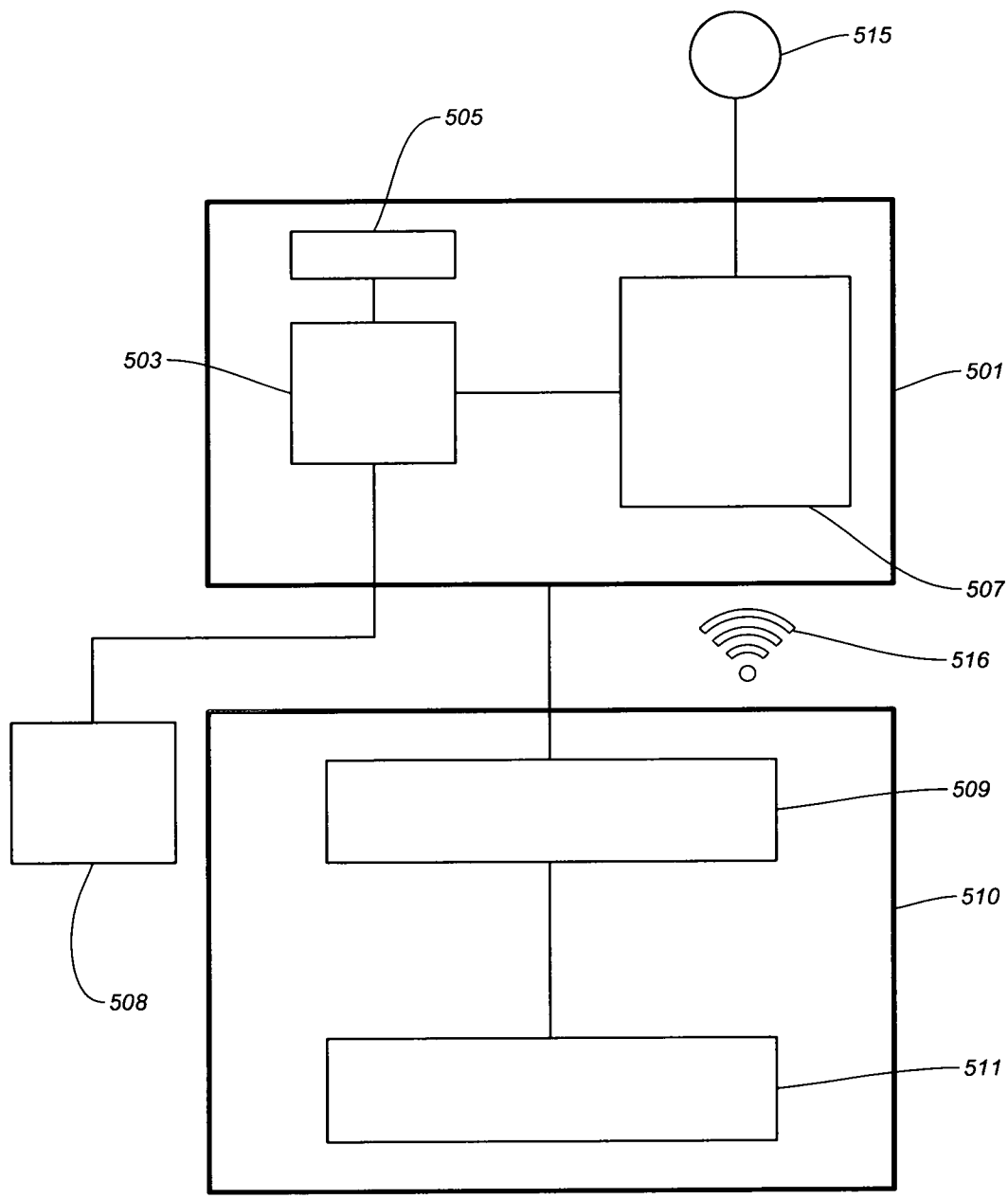
FIG. 5A shows a schematic representation of a control module for controlling positioning of a LED grow-light canopy relative to a grow bed, and to implement a grow-light protocol or program, in accordance with the embodiments of the invention.

FIG. 5A shows a schematic representation of control module 501, which controls the positioning of a LED grow-light canopy 510, with linear LED light bars 509 and 511, relative to a grow bed (not shown) and implementing grow-light protocols or programs. The control module 501 includes a micro-processor with memory 507 for storing data and running grow-light protocols or programs. The control module is coupled to sensor 515, to receive environmental data, and a radio receiver 508, to receive input instructions 516. In operation, an output interface 503 instructs stepper motors 505 to move the LED grow-light canopy 510 in accordance with grow-light protocols or programs, and input instructions 516 received by the radio receiver 508 and the environmental data provided by the sensors 515.

Figure 5B:
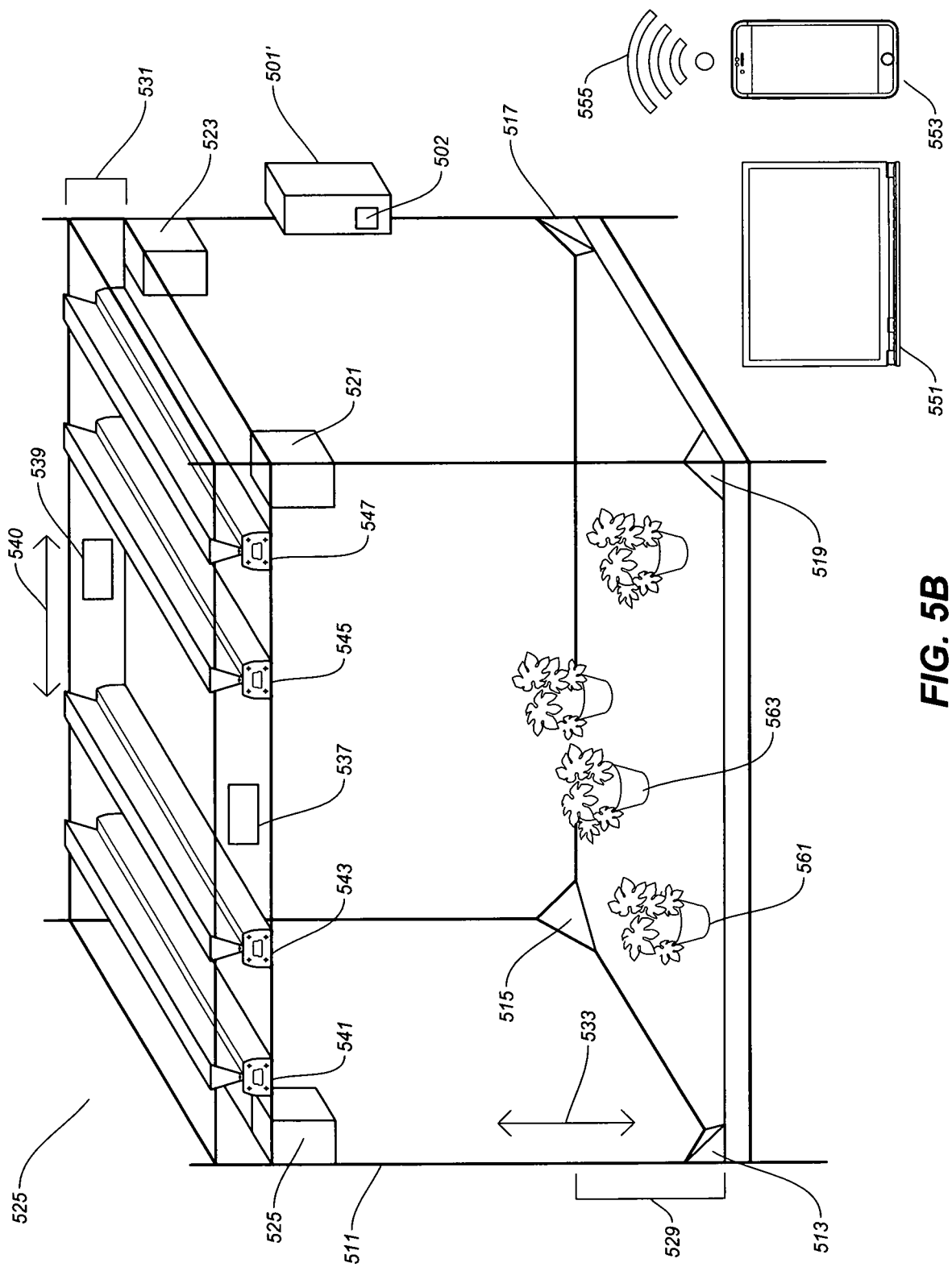
FIG. 5B illustrates a LED grow-light system with a control module, sensors, and a movable LED grow-light canopy, in accordance with the embodiments of the invention.

FIG. 5B is a schematic illustration of a LED grow-light system 525 in accordance with the embodiments of the invention. The LED grow-light system 525 includes a support structure 511 for supporting a grow-light canopy 531 over a grow bed 529 with plants 561 and 563 thereon. The grow-light canopy 531 includes linear LED light bars 541, 543, 545 and 547 that are configured to move up and down a portion of the support structure 511, as indicated by the arrow 533, via stepper motors 521, 523, 525 or any other suitable mechanism including, but not limited to, chain, pulley and wheel-type mechanisms. The LED grow-light system 525 can also include a number of environmental sensors 513, 515, 517 and 519 for detecting lighting conditions, temperature conditions and/or moisture conditions. The environmental sensors 513, 515, 517 and 519 are preferably in communication with a control module 501', directly or through a wireless network, to provide growing condition feedback used to modify the operational parameters of the LED grow-light system 525. The control module 501' includes all of the necessary components to control the position of the grow-light canopy 531 relative to the grow bed 529 and/or the plants 561/563 thereon, as well as operating the lighting (illumination times/intensities/colors) provided by the grow-light canopy 531. The control module can include an antenna structure 502 for receiving remote control commands 555 from a wireless remote control device 553, such as a cell phone, and/or receiving input data or command instructions over a network via a networked remote computer 551 to run grow-light protocols and programs, and execute the command instructions. In yet further embodiments of the invention, the LED grow-light system 525 grow-light canopy 531 also includes additional motors or mechanisms 537 and 539 for modulating the lateral spacing of adjacent LED light bars 541, 543, 545, and 547 in the directions indicated by the arrows 540 on the grow-light canopy 531.

Figure 6A:
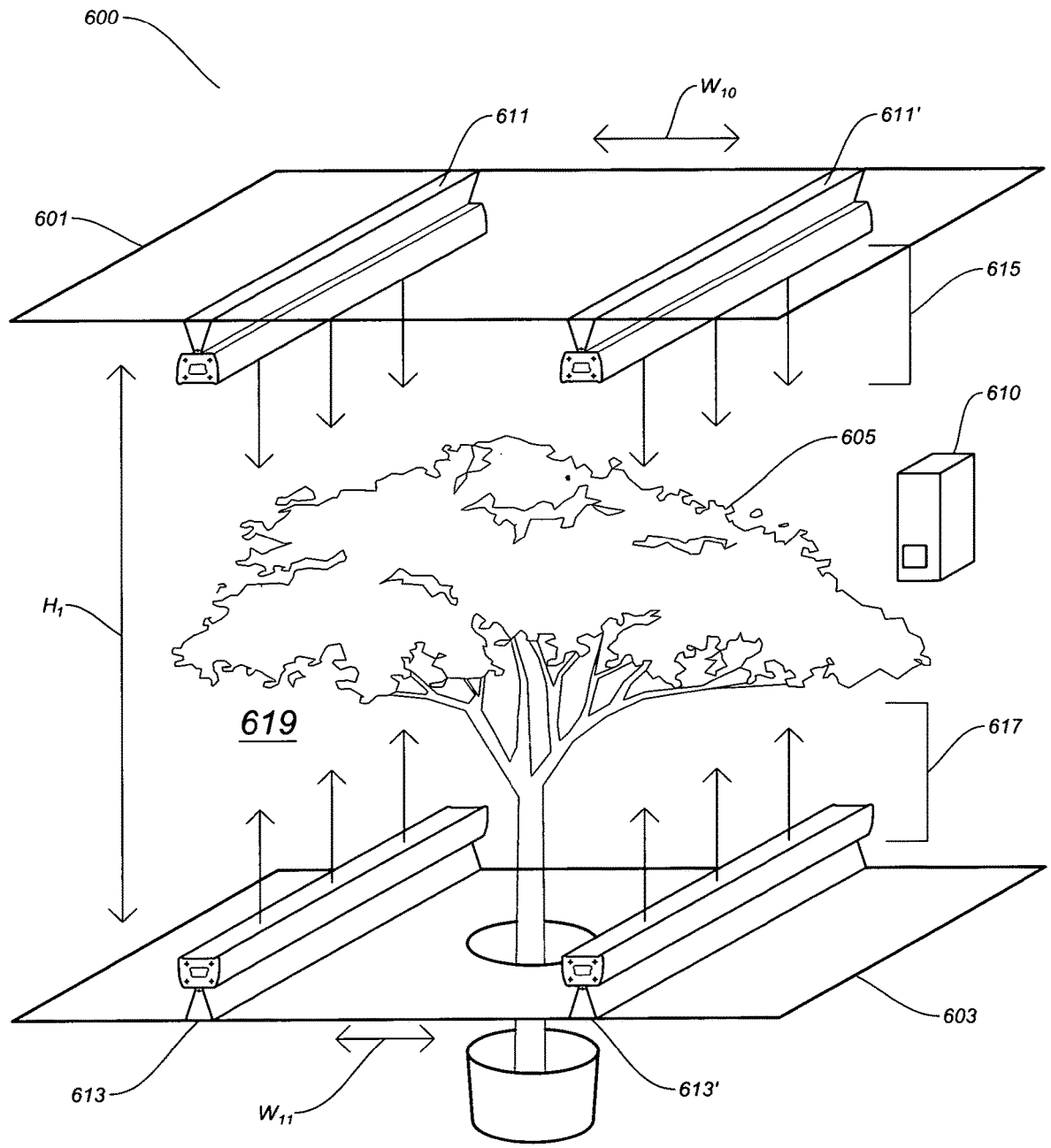
FIG. 6A shows a schematic representation of a dual-layer LED grow-light system with a control module to control the position of the canopies, and/or the LED light bars, relative to the grow bed, in accordance with the embodiments of the invention.

FIG. 6A illustrates a dual-layer LED grow-light, system 600 in accordance with the embodiments of this invention. The dual-layer grow-light system 600 includes a top light canopy 601 and a bottom light canopy 603. Each of the light canopies 601 and 603 include sets of light bars 611/611' and 613/613', respectively. Each of the light bars, 611/611' and 613/613', include LEDs, or combinations of LED arrays, to provide lighting with color temperatures and light intensities suitable for the application at hand. Lighting color temperatures and intensities emitted by the arrays of LEDs, or combinations of LED arrays, can be adjusted and controlled through a control module 610 (described in FIG. 5A-5B), which operates in response to sensor feedback and lighting protocols or programs running on a micro-processor.

In continued reference to FIG. 6A, the top light canopy 601 is preferably larger than the bottom light canopy 603 and a grow bed (not shown). The light bars 611/611' on the top light canopy 601 provide downward lighting, as indicated by the arrows 615, and the light bars 613/613' on the bottom light canopy 603 provide upward lighting, as indicated by the arrows 617. In operation, the dual-layer LED grow-light, system 600 combines downward lighting 615 above the foliage, and upward lighting 617, under the foliage, into a central illumination area 619 between the top light canopy 601 and the bottom light canopy 603.

In accordance with another embodiment of the invention, the distances $W_{10}$ and $W_{11}$ between the light bars 611/611' and 613/613' are adjustable, and the distance $H_1$ between the top light canopy 601 and bottom light canopy 603 are also adjustable. For example, the light canopies 601 and 603, and/or the light bars 611/611' and 613/613', are coupled to one or more stepper motors, or any other suitable mechanism, that is capable of adjusting $W_{10}$, $W_{11}$ and/or $H_1$ in accordance with the lighting needs of the vegetation 605 being cultivated. In addition, the positioning of $W_{10}$, $W_{11}$ and $H_1$ can be adjusted manually.

Figure 6B:
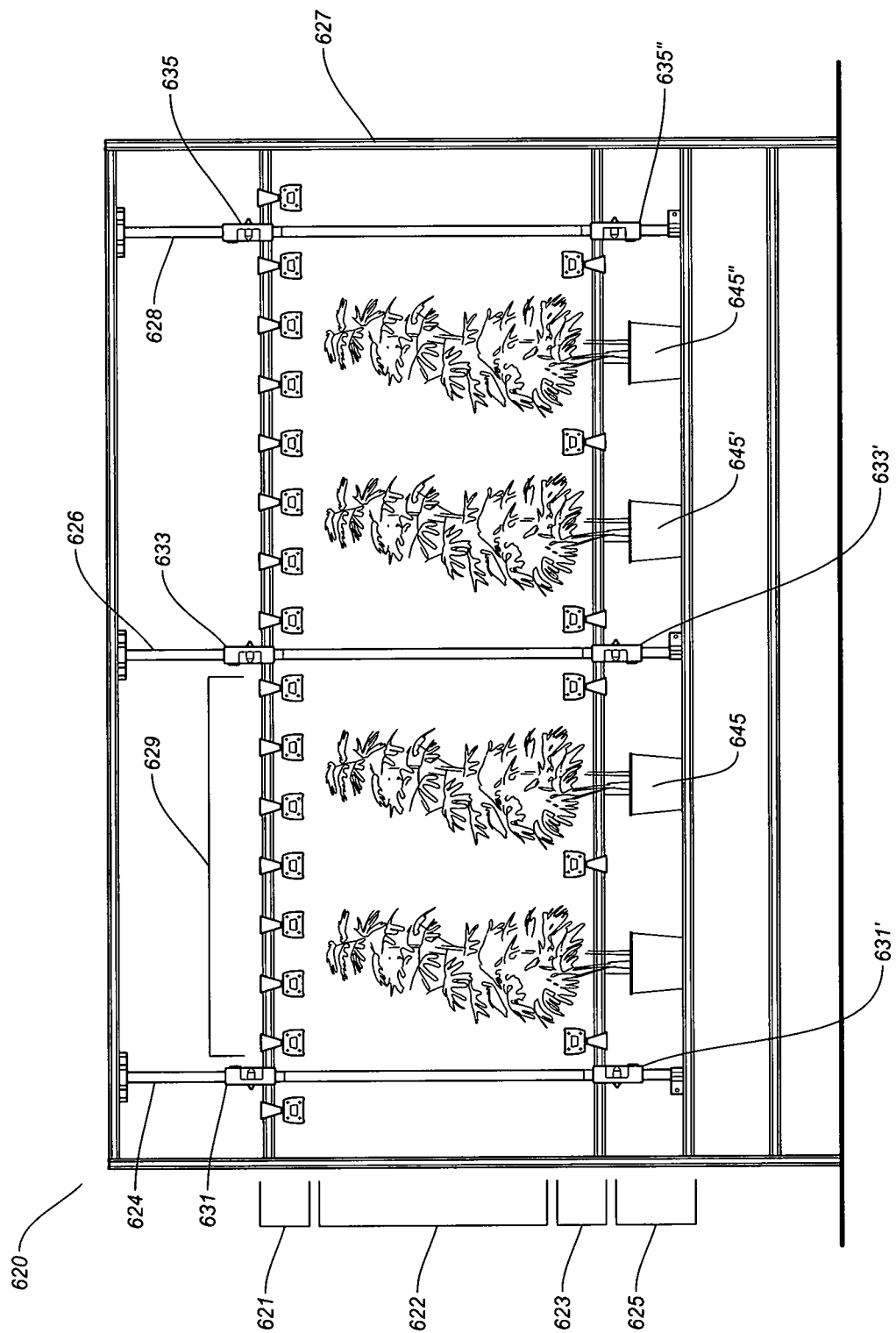
FIG. 6B illustrates a dual-layer LED grow-light, system with top and bottom LED grow-light canopies that are positioned relative to a grow bed using stepper motors, that are attached to the LED grow-light canopies, which move up and down along the canopy support pole structure, in accordance with the embodiments of the invention.

Referring to FIG. 6B, a LED grow-light system 620 includes a top light canopy 621 and bottom light canopy 623 with any number of LED light bars 629 that move up and down relative to grow bed 625. The grow-light system 620 has a canopy support structure 627 that includes vertical poles 624, 626, and 628. The top light canopy 621 and bottom light canopy 623 preferably moves up and down relative to the grow bed 625 using stepper motors 631/631', 633/633', and 635/635', which are attached to grow-light canopies 621 and 623 that move up and down along vertical poles 624, 626, and 628. In accordance with the embodiments of the invention, the grow-light canopy 621 and 623 can move, automatically or manually, to accommodate growth of vegetation 645/645'/645" being cultivated. Furthermore, grow bed 625 can also move up and down using stepper motors (similar to 631/631', 633/633', and 635/635 or any suitable mechanism) automatically, or manually, along vertical poles 624, 626, and 628 to accommodate growth of vegetation 645/645'/645" being cultivated within the central illumination area 622.

The system utilizes a T-slot interconnects. A T-slot interconnect 703 includes body portion 704 and two orthogonally elongated and opposed interlock tabs 705 and 709 positioned on opposed sides of the body portion 704. In operation one of the elongated interconnect tabs 709 is fitted into a T-slot channel 719 of a T-slot bar 701 and the body portion 704 is turned, as indicated by the arrow 712, such that the elongated interconnect tab 709 is locked within the T-channel 719 of the T-slot bar 701.

Figure 8A:
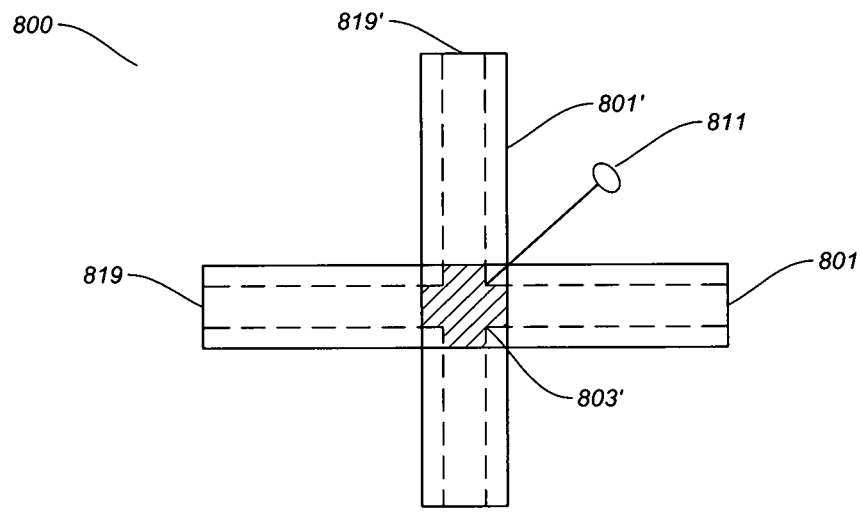
FIGS. 8A-B illustrate representations of a T-slot interconnect for orthogonally connecting two T-slot bars with opposed and elongated interlock tabs that secure within T-channels of the T-slot bars, in accordance with the embodiments of the invention.

In other operations, the two orthogonally elongated interlock tabs 705 and 709 of a T-slot interconnect 703 or 803 are placed into orthogonally positioned T-channels 819 and 819' of two orthogonally positioned T-slot bars 801 and 801' (FIG. 8A). Then the interconnect 703 or 703 is rotated through the body portion 704 using a extended clip, hook, harnesses or other structure 711 or 711 and thereby secure the of two orthogonally positioned T-slot bars 801 and 801' in their positions.

Alternatively, after the elongated interconnect tabs 709 is fitted into a T-slot channel 719 and secured therein, the remaining elongated interconnect tab 705 is placed into a T-channel 819' of a second T-slot bar, such as 801' (FIG. 8A) and the second T-slot bar 801 is rotated such the remaining elongated interconnect tab is locked or secured within the T-channel 819' of the second T-slot bar 801'. The structure 711/811 attached to the body portion 704 the T-slot interconnect 703/803 can be used for supporting or securing wiring or cables.

Figure 7A:
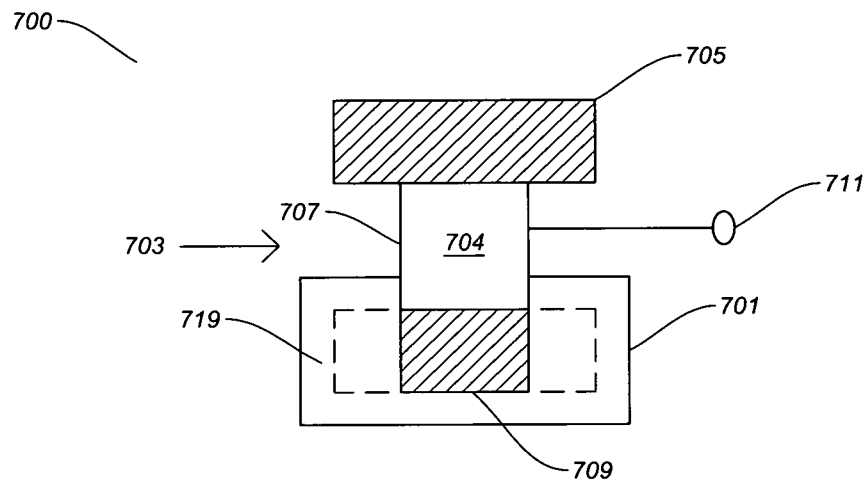
FIGS. 7A-B show schematic representations of a T-slot interconnect for securing to a T-slot bar, in accordance with the embodiments of the invention.
Figure 7B:
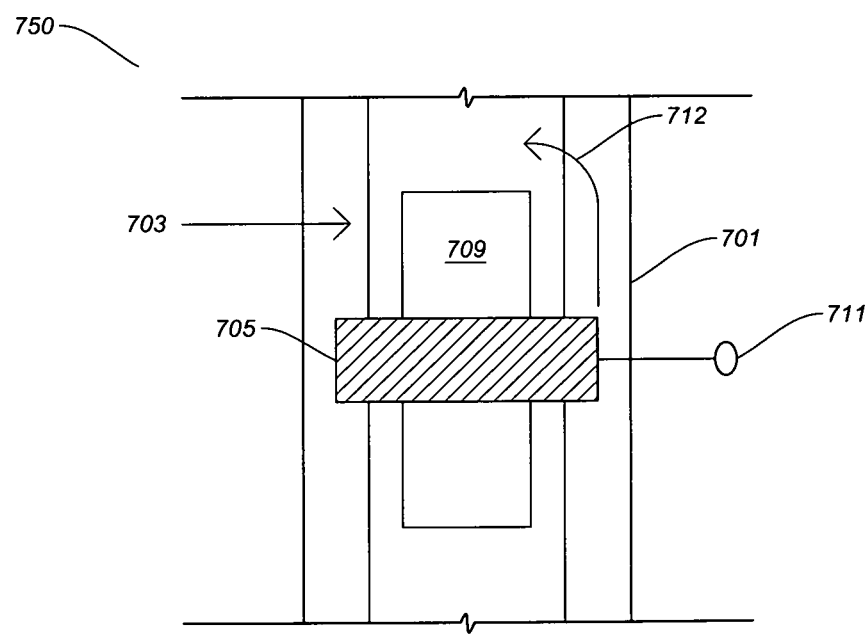
Figure 8B:
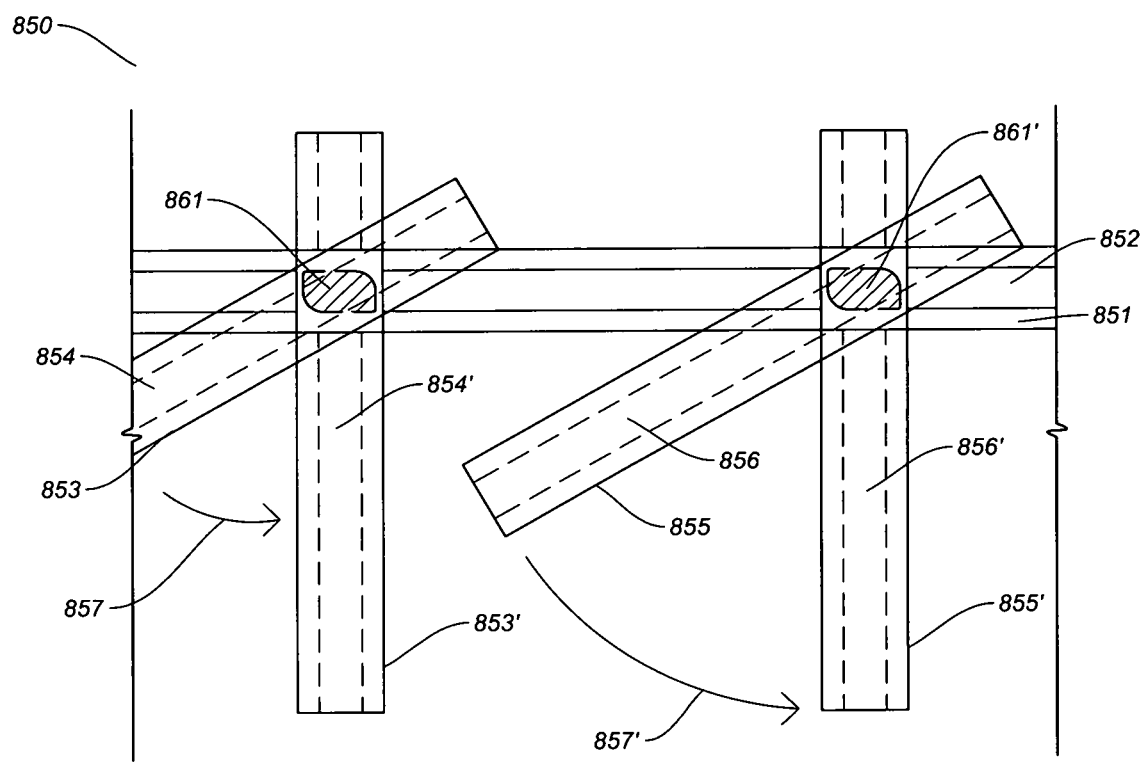
Figure 9B:
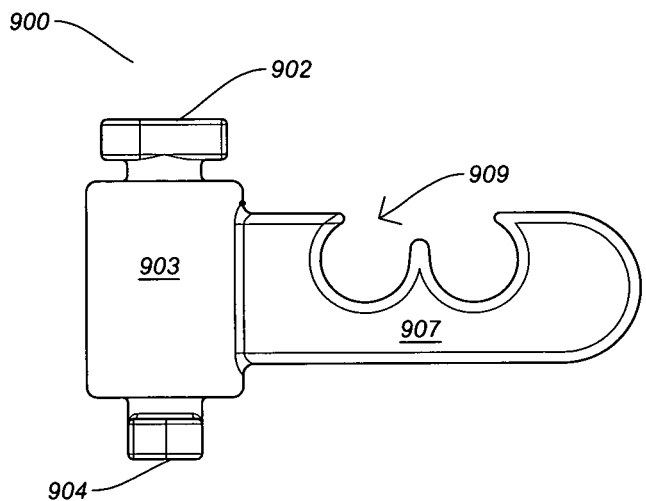
FIGS. 9A-D shows detailed engineering drawings of a T-slot interconnect with a support structure attached to a body portion of the T-slot interconnect, in accordance with the embodiments of the invention.
Figure 9A:
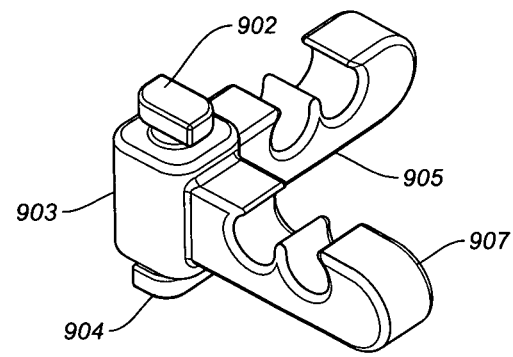
Figure 9C:
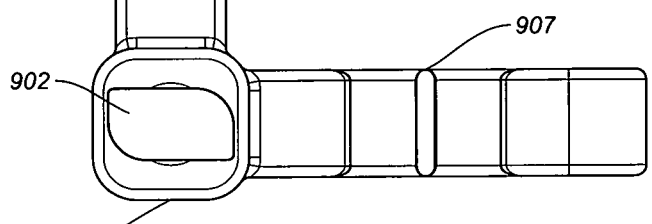
Figure 9D:
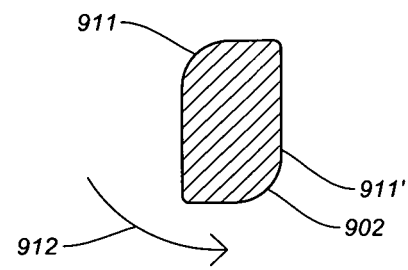

Regardless, of how the T-slot interconnects are rotated relative to a T-channel of a T-slot bar, FIG. 8B illustrates how to build a T-bar structure 850 using T-slot bars and the T-slot interconnects of the present invention. In operation elongated interlock tabs 705 and 709 (FIGS. 7A-B) of T-slot interconnects 861 and 861' are places within T-channels 852, 854'/856' of orthogonally positioned T-slot bars 851 and 853'/855'. The T-slot interconnects 861 and 861' are then turned, such the elongated interlock tabs 705 and 709 turn within the T-channels 852, 854' and 856' and are secured therein to form the T-slot bar structure 850.

Alternatively, one of the elongated interlock tabs from each of the T-slot interconnects 861 and 861' are place within a T-channel 852 of a T-slot bar 851 and secured therein by turning the T-slot interconnects 861 and 861'. Then the remaining elongated interlock tabs from each of the T-slot interconnects 861 and 861' are positioned within T-channels 854 and 856 of the T-slot bars 853 and 855 and the T-slot bars 853 and 855 are rotated as indicated by the arrows 857 and 857' to secure the remaining elongated interlock tabs from each of the T-slot interconnects 861 and 861' within the T-channels 854 and 856 of the T-slot bars 853 and 855 to form the T-slot bar structure 850.

FIGS. 9A-D shows detailed engineering drawings of a T-slot interconnect 900 with support structures 905 and 907 attached to a body portion 903 of the T-slot interconnect 900 for securing or holding wires and/or cables in clip portions 909, in accordance with the embodiments of the invention. The T-slot interconnect 900 has two opposed and orthogonally elongated interlock tabs 902 and 904 that are fitted into T-channels of T-slot bars and/or T-slot light bars. The opposed and orthogonally elongated interlock tabs 902 and 904 preferably have opposed curved edges 911 and 911' that allow the T-slot interconnect 900 to be preferentially turned or rotated in one rotational direction 912 with T-channels of T-slot bars and/or T-slot light bars to secure the T-slot bars and/or T-slot light bars together through the T-slot interconnect 900, as described in detail above. The support structures 905 and 907 can act as handles to leverage or assist turning or rotating the opposed and orthogonally elongated interlock tabs 902 and 904 within T-slot channels and can hold or secure wiring or cables in a clip portion 909.

Figure 10A:
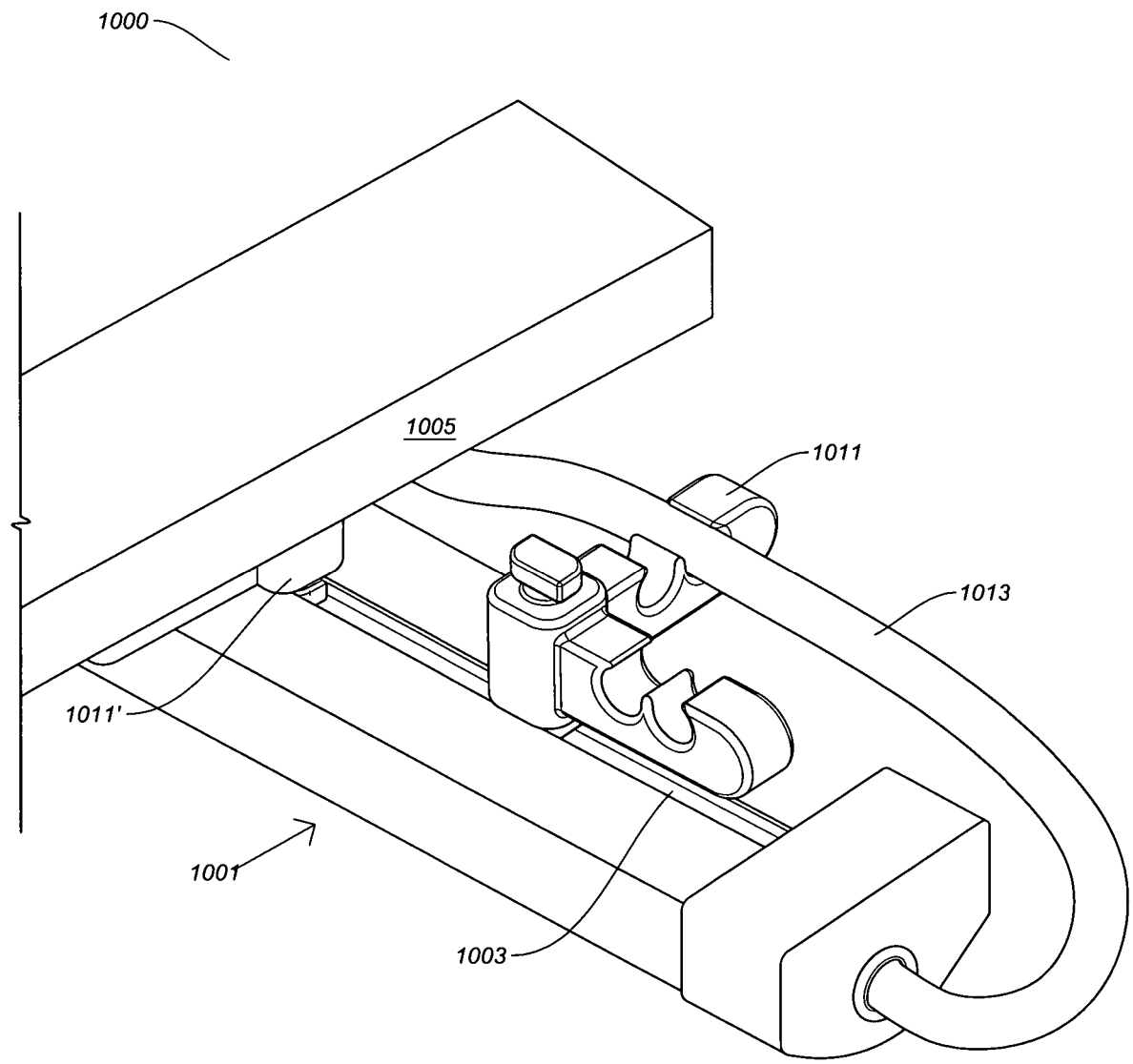
FIGS. 10A-C illustrate T-slot interconnects used to form T-slot bar structures and securing T-slot light bars to the T-slot bar structures, in accordance with the embodiments of the invention.

FIG. 10A shows a view of a T-bar structure 1000 with a T-slot interconnect 1011 (900; FIGS. 9A-D) with an elongated interlock tab secured within a T-channel 1003 of a T-slot light bar 1001 and with support structure securing and holding a cable 1013 for powering the T-slot light bar 1001. The T-slot bar structure 1000 also has a T-slot interconnect 1011 with elongated interlock tab secured within T-channel 1003 of the T-slot light bar 1001 and a T-channel of a T-slot bar 1005 for securing the T-slot light bar 1001 to the T-slot bar 1005 of the T-slot bar structure 1000.

Figure 10B:
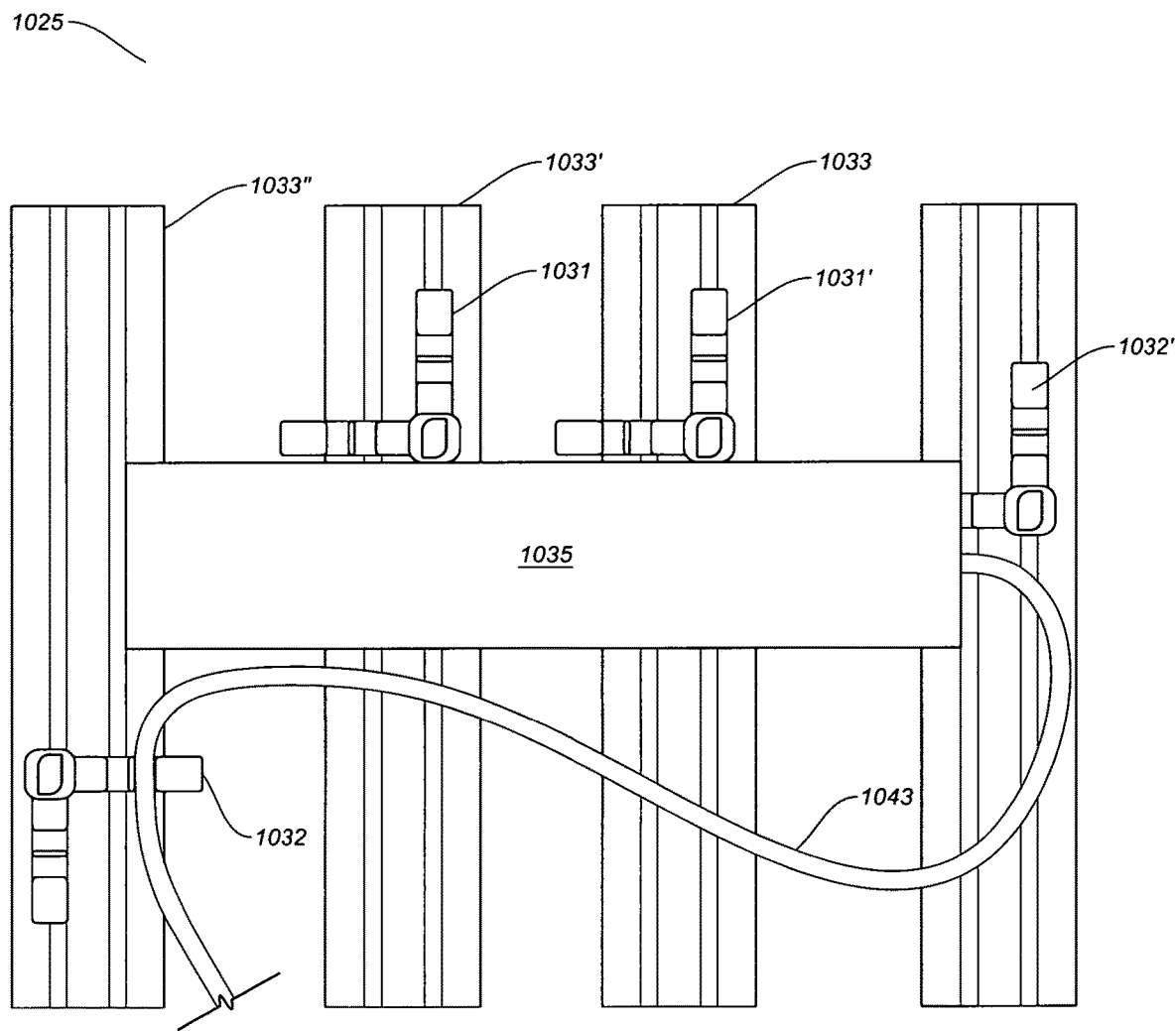

FIG. 10B shows a view of a T-slot bar structure 1025 formed from multiple T-slot light bars 1033, 1033' and 1033". The T-slot bar structure 1025 includes an LED driver 1035 that is secured in positioned through two T-slot interconnects 1031 and 1031' with elongated interlock tabs secured within T-channels of the T-slot light bars 1033 and 1033'. The T-bar structure 1025 also includes a T-slot interconnects 1032 and 1032' secured within T-channels of the T-slot light bars 1033" and 1034 for holding or supporting power cables, such as the power cable 1043.

Figure 10C:
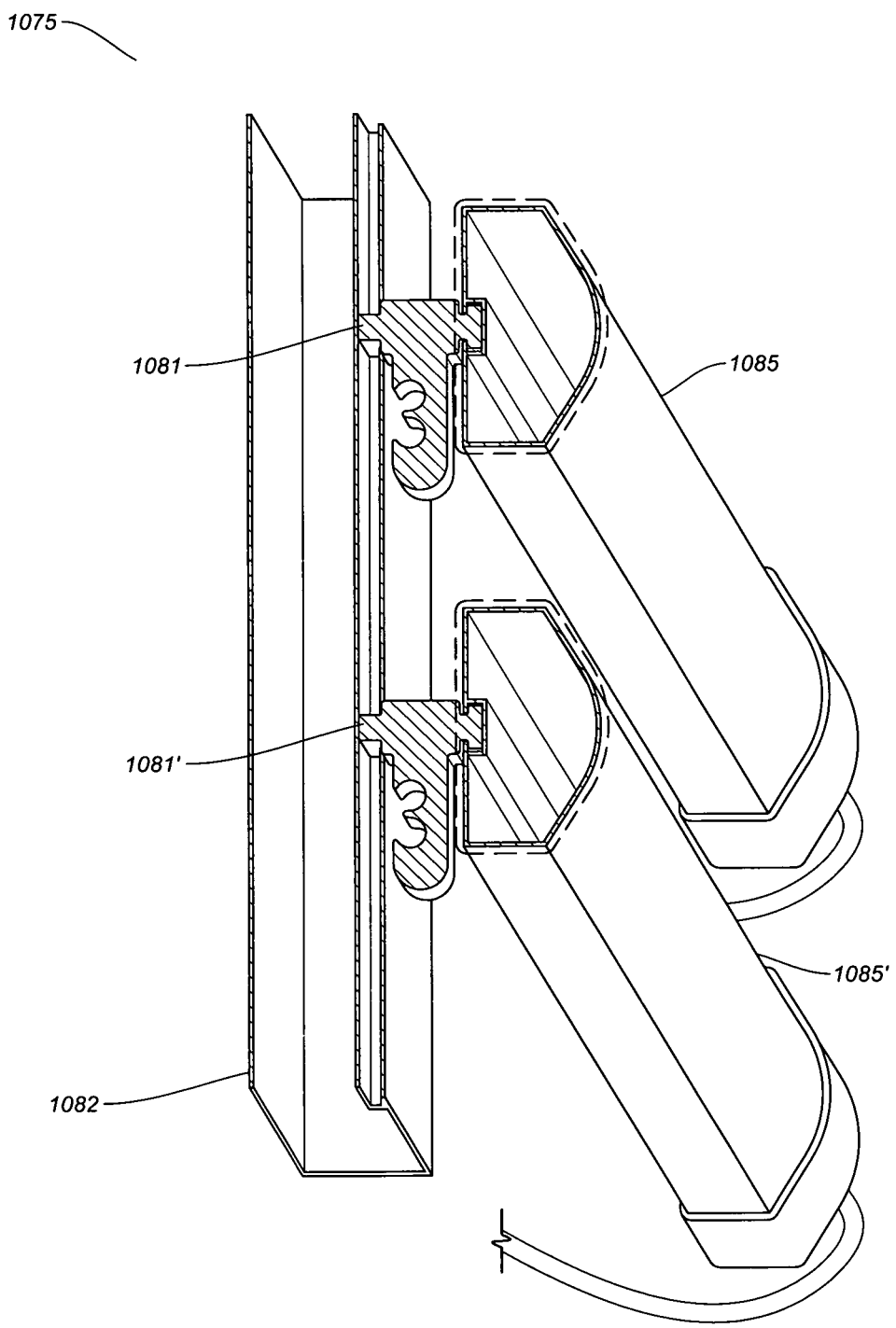

FIG. 10C shows a view of a T-slot bar structure 1075 formed from T-slot light bars 1085 and 1085' and a T-slot bar 1082. The T-slot light bars 1085 and 1085' are secured to the T-slot bar 1082 via T-slot interconnects 1081 and 1081' (900; FIGS. 9A-D). Again, the T-slot interconnects 1081 and 1081' are secured within T-channels of the T-slot light bars 1085 and 1085' and/or T-slot bar 1082 by elongated interlock tabs, as described above.

In further embodiments of the invention, one of the elongated interlock tabs 705 or 709 (FIGS. 7A-B) of the T-slot interconnect 703 is replaced by a loop structure, a hook structure or bracket structure 711 for mounting for attaching the T-slot interconnect 703, and any T-slot bar attached thereto, to a wall, ceiling or other support structure. In still further embodiments of the invention the body portion 704 of the T-slot interconnect 703 is formed from two hexagonally shaped parts or portions that are capable of being rotated independently and with respect to each other using, for example, a wrench, to secure the one or more of the interconnect tabs 705 and 709 within T-channels of T-slot bars or T-slot light bars.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention. For example, the grow bed can also be configured to move up and down automatically. Moreover, multiple layers of grow-light canopies, with downward or upward illumination, and/or grow beds can be utilized when suitable for the application at hand.

What is claimed is:

1. A LED grow-light system comprising:
   a) a light canopy with T-slot bars and T-slot LED light bars for providing lighting into a central illumination area; and
   b) T-slot interconnects for securing the T-slot bars and T-slot LED light bars together to form the light canopy, the T-slot interconnects comprising body portions and two orthogonally elongated interlock tabs positioned on opposed sides of the body portions for placing into T-channels of the T-slot bars and/or T-slot light bars, wherein rotating the body portion secures the elongated interlock tabs within the T-channels and securing the T-slot bars and/or T-slot LED light bars together through the interconnect.

2. The LED grow-light system of claim 1, wherein the light canopy moves up and down to modulate the central illumination area.

3. The LED grow-light system of claim 1, wherein LEDs within the T-slot LED light bars are spatially modulated.

4. The LED grow-light system of claim 1, wherein separations between a portion of the T-slot LED light bars are spatially modulated.

5. The LED grow-light system of claim 2, further comprising stepper motors for automatically moving the light canopy up and down.

6. The LED grow-light system of claim 5, further comprising a control module for automatically controlling the stepper motors in response to control commands.

7. The LED grow-light system of claim 6, further comprising sensors for providing environmental data to the control module, wherein the environmental data is used to generate the control commands.

8. A LED grow-light system comprising:
   a) a light canopy with T-slot bars and T-slot LED light bars for providing downward lighting into a central illumination area wherein the light canopy moves up and down relative to a grow bed; and
   b) T-slot interconnects for securing to the T-slot bars and/or a T-slot light bars, the T-slot interconnects comprising body portions and at least one elongated interlock tab positioned one side of the body portions for placing into a T-channel of the T-slot bars and/or T-slot light bars, wherein rotating the body portions secures the T-slot interconnect to the T-slot bars and/or the T-slot LED light bars.

9. The LED grow-light system of claim 8, wherein separations between a portion T-slot LED light bars are adjustable.

10. The LED grow-light system of claim 8, wherein LEDs within the T-slot LED light bars are spatially modulated to provide greater light output near ends of the T-slot LED light bars.

11. The LED grow-light system of claim 8, further comprising stepper motors for automatically moving the light canopy up and down.

12. The LED grow-light system of claim 11, further comprising a control module for automatically controlling the stepper motors in response to control commands.

13. The LED grow-light system of claim 12, further comprising sensors for providing environmental data to the control module, wherein the environmental data is used to generate the control commands.

14. A LED grow-light system comprising:
   a) a top light canopy with top T-slot bars and top T-slot LED light bars for providing downward lighting into a central illumination area; and
   b) a bottom light canopy with bottom T-slot bars and bottom T-slot LED light bars for providing upward lighting into the central illumination area, wherein the top T-slot bars and top T-slot LED light bars of the top light canopy and/or the bottom T-slot bars and bottom T-slot LED light bars of the bottom light canopy are secured together through T-slot interconnects comprising body portions and two orthogonally elongated interlock tabs positioned on opposed sides of the body portions for placing into T-channels of the top T-slot bars and top T-slot LED light bars and/or the bottom T-slot bars and bottom T-slot LED light bars.

15. The LED grow-light system of claim 14, further comprising a control module for receiving the control commands.

16. The LED grow-light system of claim 15, wherein the control module includes a micro-processor for executing a grow-light protocol or program and controlling light emitted from the top light canopy and the bottom light canopy in accordance with the grow-light protocol or program.

17. The LED grow-light system of claim 14, wherein LEDs within the top T-slot LED light bars or bottom T-slot LED light bars are spatially modulated.

18. The LED grow-light system of claim 14, wherein separations between a portion of the top T-slot LED lights bars or bottom T-slot LED light bars are spatially modulated.

19. The LED grow-light system of claim 14, further comprising stepper motors for automatically moving the top light canopy or the bottom light canopy up and down in response to control commands.

20. The LED grow-light system of claim 14, further comprising sensors for providing environmental data to the control module, wherein the environmental data is used to generate the control commands.

* * * * *